(12) United States Patent
Posset et al.

(10) Patent No.: US 9,249,353 B2
(45) Date of Patent: Feb. 2, 2016

(54) FLEXIBLE TRANSPARENT ELECTROCHOMIC DEVICE, AND A METHOD FOR THE PREPARATION THEREOF

(71) Applicants: HYDRO-QUEBEC, Montréal (CA); FRAUNHOFER GESELLSCHAFT ZUR FOERDERUNG DER ANGEWANDTEN FORSCHUNG E.V., Munich (DE); CONSORZIO INTERUNIVERSITARIO NAZIONALE PER LA SCIENZA E TECNOLOGIA DEI MATERIALI INSTM, Florence (IT); UNIVERSITA DEGLI STUDI DI MILANO-BICOCCA, Milan (IT)

(72) Inventors: Uwe Posset, Cadolzburg (DE); Bettina Herbig, Erlabrunn (DE); Gerhard Schottner, Heilsbronn (DE); Karim Zaghib, Longueuil (CA); Jean-François Labrecque, Montréal (CA); Abdelbast Guerfi, Brossard (CA); Michel Perrier, Montréal (CA); Riccardo Ruffo, Bresso (IT); Matteo Marco Salamone, Brugherio (IT); Claudio Maria Mari, Milan (IT); Luca Beverina, Milan (IT); Giorgio Pagani, Milan (IT); Martin Dontigny, Notre-Dame-du-Mont-Carmel (CA)

(73) Assignees: HYDRO-QUEBEC, Montreal, Quebec (CA); FRAUNHOFER GESELLSCHAFT ZUR FOERDERUNG DER ANGEWANDTEN FORSCHUNG E.V., Munich (DE); CONSORZIO INTERUNIVERSITARIO NAZIONALE PER LA SCIENZA E TECNOLOGIA DEI MATERIALI INSTM, Florence (IT); UNIVERSITA DEGLI STUDI DI MILANO-BICOCCA, Milan (IT)

(*) Notice: Subject to any disclaimer, the term of this patent is extended or adjusted under 35 U.S.C. 154(b) by 0 days.

(21) Appl. No.: 14/345,837

(22) PCT Filed: Sep. 19, 2012

(86) PCT No.: PCT/EP2012/068434
§ 371 (c)(1),
(2) Date: Mar. 19, 2014

(87) PCT Pub. No.: WO2013/041562
PCT Pub. Date: Mar. 28, 2013

(65) Prior Publication Data
US 2014/0226201 A1     Aug. 14, 2014

(30) Foreign Application Priority Data

Sep. 19, 2011  (EP) .................... 11181749

(51) Int. Cl.
*G02F 1/15* (2006.01)
*G02F 1/153* (2006.01)
*C09K 9/02* (2006.01)
*G02F 1/155* (2006.01)

(52) U.S. Cl.
CPC . *C09K 9/02* (2013.01); *G02F 1/153* (2013.01); *G02F 1/155* (2013.01); *G02F 1/1533* (2013.01); *G02F 1/1508* (2013.01); *G02F 1/1525* (2013.01); *G02F 2001/1519* (2013.01); *G02F 2001/1555* (2013.01)

(58) Field of Classification Search
CPC ........ G02F 1/1533; G02F 1/153; G02F 1/155
USPC ........... 359/265–275, 900; 345/105; 429/209, 429/212, 213, 218.5; 252/582, 589
See application file for complete search history.

(56) References Cited

U.S. PATENT DOCUMENTS

| | | | |
|---|---|---|---|
| 6,791,737 B2 * | 9/2004 | Giron | 359/265 |
| 2002/0012848 A1 | 1/2002 | Callahan | |
| 2004/0012869 A1 | 1/2004 | Hourquebie et al. | |
| 2005/0025980 A1 | 2/2005 | Agrawal et al. | |
| 2008/0186559 A1 | 8/2008 | Willard et al. | |
| 2009/0052006 A1 | 2/2009 | Xu et al. | |
| 2009/0211494 A1 | 8/2009 | Kawamoto et al. | |
| 2011/0122476 A1 | 5/2011 | Zaghib et al. | |
| 2013/0260232 A1 * | 10/2013 | Lu et al. | 429/211 |
| 2015/0017544 A1 * | 1/2015 | Prasad et al. | 429/232 |

OTHER PUBLICATIONS

International Search Report (PCT/ISA/210) mailed on Oct. 24, 2012, by the European Patent Office as the International Searching Authority for International Application No. PCT/EP2012/068434.

Written Opinion (PCT/ISA/237) mailed on Oct. 24, 2012, by the European Patent Office as the International Searching Authority for International Application No. PCT/EP2012/068434.

EP Search Report dated Jan. 18, 2012 in corresponding EP Appln No. 11181749.0 (6 pages).

Marcilla et al. "Tailor-made polymer electrolytes based upon ionic liquids and their application in all-plastic electrochromic devices" (7 pages), Science Direct, Electrochemistry Communications, vol. 8 (2006), pp. 482-488.

* cited by examiner

*Primary Examiner* — Tuyen Tra

(74) *Attorney, Agent, or Firm* — Buchanan Ingersoll & Rooney P.C.

(57) ABSTRACT

A flexible transparent electrochromic device, which includes the following components, each of which is a flexible film: a working electrode comprising a transparent conducting substrate supporting an working electrode active material; a counter electrode including a transparent conducting substrate supporting a counter electrode active material; a solid polymer electrolyte (SPE) including a solution of a lithium salt in a polymer solvent. A method for preparing an electrochromic device includes the steps of: preparing a working electrode film, preparing a counter electrode film, preparing a polymer electrolyte film, and assembling the electrodes and the electrolyte, the method being implemented continuously.

24 Claims, 13 Drawing Sheets

FLEXIBLE TRANSPARENT ELECTROCHOMIC DEVICE, AND A METHOD FOR THE PREPARATION THEREOF

The present disclosure is related to a flexible transparent electrochromic device and a method for the preparation thereof.

TECHNOLOGICAL BACKGROUND

An electrochromic device (ECD) typically comprises a conducting substrate coated with a working electrode material, a conducting substrate coated with a counter electrode material, and an electrolyte placed between the electrodes and facing the electrode active material coatings, each of these elements being in the form of a film.

The conducting substrate can be made of a non conducting sheet coated by a conducting film. The non conducting substrate can be made for instance of glass. It can also be made of a non conducting polymer e.g. polyethylene terephthalate PET) for flexible ECD's. The conducting film may be a film of a transparent conducting oxide (TCO). The TCO may be ITO, or a doped zinc oxide (AZO, GZO, SZO), or a fluorine doped oxide (FTO) (WO2008/064878). The conductive film may also be a film of a conducting polymer, such as for instance a PDOT.

The electrolyte can be in liquid, gel or solid (polymer) form.

The active material of the working electrode may be an organic or an inorganic oxide, or polymers obtained from monomers derived from alkylene dioxythiophenes (PDOT). A number of active materials, in particular polymers, are disclosed in WO2008/064878.

The active material of the counter electrode may be Prussian Blue (PB) $LiFePO_4$, $NiO_x$, a conductive polymer (such as polyaniline, polythiophene or polypyrrole), or $H_xIrO_2$. See for instance WO2009/098415.

A. J. Widjaja, et al. [Solar Energy Materials & Solar Cells, 92 (2008) 97-100] teach a method for preparing an ECD where at least one element is prepared by a R2R method. However, Widjaja teaches the use of R2R in a general way, the only material which is illustrated being $WO_3$, and concludes that it might not be obvious for the skilled person to use the R2R method for any material which is part of an ECD.

The known methods allow production of ECD's having good performance. However, they generally do not allow continuous manufacturing of ECD's of large dimensions.

The aim of embodiments of the present disclosure is to provide a method for producing large dimension mechanically flexible transparent ECD's possibly by a continuous method.

SUMMARY

An embodiment of the present disclosure is related to a flexible transparent electrochromic device (ECD), which comprises the following components, each of which is a flexible film:
 a working electrode comprising a transparent conducting substrate supporting an working electrode active material;
 a counter electrode comprising a transparent conducting substrate supporting a counter electrode active material;
 a solid polymer electrolyte (SPE) comprising a lithium salt in a polymer solvent wherein:
 the working electrode active material is a polymer having repeat units of general formula (I)

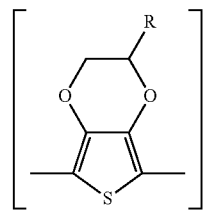

wherein R is —$CH_2OR'$, R' being selected from the following groups: —H, —R", —(C=O)NH—R" or —(C=O)—R", R" being an alkyl group or an alkenyl group;
 the counter electrode active material is selected from hexacyanometallates or from transition metal oxides.
 the electrolyte film is a film material that comprises a crosslinked polymer and a lithium salt.

In a preferred embodiment, the conducting substrate of the working electrode and the conducting substrate of the counter electrode are identical.

A method for preparing certain embodiments of a flexible transparent electrochromic device of the disclosure comprises the steps of:
 preparing a working electrode film,
 preparing a counter electrode film,
 preparing a polymer electrolyte film, and
 assembling the electrodes and the electrolyte.

In one aspect of the disclosure, the working electrode is prepared by a method comprising the following steps:
 providing a conducting substrate made of a flexible transparent conducting material film;
 providing a liquid composition containing one or more monomers selected from the 3,4-alkylene dioxythiophene (XDOT) monomers, said monomer(s) being dissolved in a solvent;
 coating said liquid composition on the substrate;
 treating the coated composition to polymerize the XDOT monomers.

In another aspect, the counter electrode film is prepared by a method comprising the following steps:
 preparing a counter electrode composition which contains a stable suspension of active counter electrode nanoparticles;
 coating said counter electrode composition on the surface of the conducting substrate.

The polymer electrolyte film is prepared from a liquid electrolyte composition containing a crosslinkable polymer (hereafter referred to as "prepolymer"), a lithium salt, optionally a solvent if the prepolymer is in solid form.

In a preferred embodiment, the electrolyte film is prepared from the liquid electrolyte composition by coating the liquid electrolyte composition on the active material surface of one of the electrodes thus forming a half cell, and submitting the liquid film obtained to a crosslinking treatment. The half cell is assembled with the second electrode film to form the ECD. The crosslinking treatment may be carried out prior to assembling the half cell and the second electrode film, or after assembling the half cell and the second electrode film.

Coating the liquid electrolyte composition on the active material surface of one of the electrodes and/or assembling the half cell and the second electrode film are preferably carried out in a continuous way. Embodiments of the disclosure provide a method which allows preparation of a transparent electrochromic device in the form of a flexible film having a large surface, in a semi-continuous or in a continuous method.

BRIEF DESCRIPTION OF THE DRAWINGS

Embodiments of the present application will by way of example be described in more detail with reference to the appended schematic drawings, which show embodiments of the present invention.

DETAILED DESCRIPTION

Figure 1:
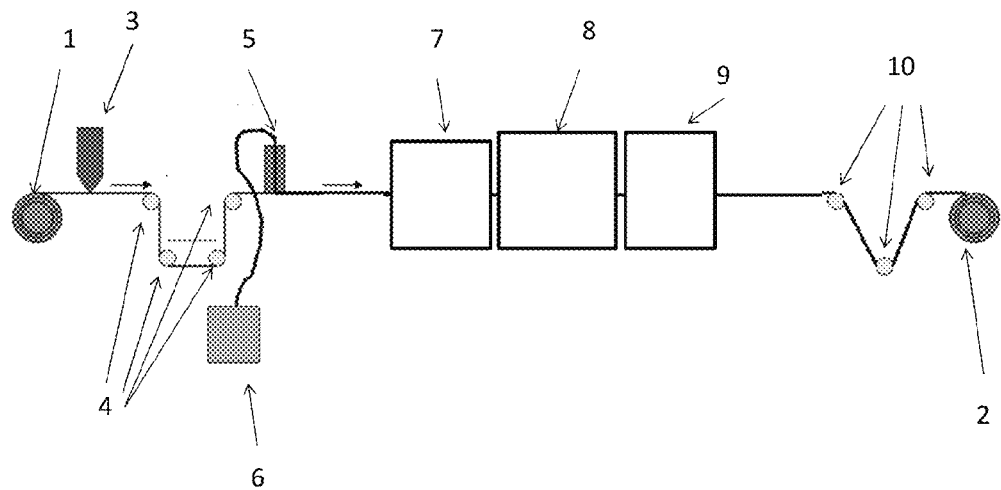
FIG. 1 shows an example of a manufacturing system represented schematically.

The flexible transparent electrochromic device (ECD) of certain embodiments of the present disclosure comprises a working electrode film comprising a transparent conducting substrate supporting an working electrode active material; a counter electrode film comprising a transparent conducting substrate supporting a counter electrode active material; and a solid polymer electrolyte (SPE) film comprising a lithium salt in a polymer solvent, each film being transparent and flexible;

wherein:
the working electrode active material is a polymer having repeat units of general formula (I)

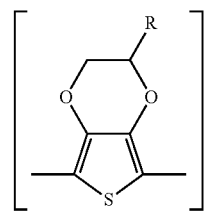

wherein R is —CH$_2$OR', R' being selected from —H, —R", —(C=O)NH—R" or —(C=O)—R", R" being an alkyl group or an alkenyl group;
the counter electrode active material is an hexacyanometallate or a transition metal;
the electrolyte film is a film material that comprises a crosslinked polymer and a lithium salt.

The electrolyte film is a transparent flexible film having a thickness of 1 to 100 µm, preferably from 25 to 50 µm, and it is made of a material that comprises a crosslinked polymer and a lithium salt. The electrolyte material may also comprise an ionic liquid, a plastifying agent, or both.

The crosslinked polymer is preferably a polymer having polyether segments linked by covalent bondings. The polyether segments preferably comprise repeat units —O—CH$_2$CHR$^s$— wherein R$^s$ is H or a side group selected from CH$_3$ and CH$_2$CH$_3$. The linking groups are preferably n-butylene groups, multibranched ether groups or butylene diester groups.

In a preferred embodiment, the electrolyte material contains an ionic liquid. The ionic liquid improves the wettability of the surface of the electrolyte film and prevents shrinking of the electrolyte film. "Ionic liquid" means a salt which is liquid at the temperature at which it is used. Typical examples of ionic liquids are salts having an organic cation which can be selected from the group comprising ethyl-methyl-imidazolium, butyl-methyl-imidazolium, N-methyl-N-propyl-pyrrolidinium, N-methyl-N-butyl-pyrrolidinium, methyl-propyl-piperidinium, butyl pyridinium, (2-methoxy-ethyl)-triethyl-ammonium, and hexyl-trimethyl ammonium. The anion of the salt can be selected from the group comprising $BF_4^-$, $CF_3SO_3^-$, bis(trifluoromethylsulfonyl)imide [$TFSI^-$], fluoromethylsulfonyl)imide [$FSI^-$], $C(CN)_3^-$ and $N(CN)_2^-$. A preferred ionic liquid is 1-ethyl-3-methylimidazolium bis(trifluoromethanesulfonyl)imide (designated as EMI TFSI), 1-ethyl-3-methylimidazolium bis(fluorosulfonyl)imide (designated as EMI FSI), N-methyl-N-propylpyrrolidinium bis(trifluoromethanesulfonyl)imide (PY13 TFSI), and N-methyl-N-propylpyrrolidinium bis(fluorosulfonyl)imide (PY13 FSI).

The lithium salt is preferably selected from lithium salts are salts of formula LiX wherein X is $ClO_4^-$, $BF_4^-$, $PF_6^-$, $CF_3SO_3^-$, $TFSI^-$, $FSI^-$, $C(CN)_3^-$ or $N(CN)_2^-$.

The electrolyte material may also contain a plasticizing agent, selected for example from high boiling point solvents. Examples are propylene carbonate, ethylene carbonate, vinyl carbonate, γ-butyrolactone and n-methylpyrrolidone. An ionic liquid may also act as a plasticizing agent.

An electrolyte material of an ECD of an embodiments of the present disclosure has preferably the following composition (weight %):

| | |
|---|---|
| crosslinked polymer | 10 to 90 |
| lithium salt | 10 to 50 |
| ionic liquid | 0 to 90 |
| plasticizing agent | 0 to 90 |

A more preferred composition (weight %) for the electrode material is:

| | |
|---|---|
| Cross linked polymer | 70 to 85 |
| Lithium salt | 15 to 30 |
| Ionic liquid | 0 to 2 |
| Plasticizing agent | 0 to 5 |

Each of the working electrode and the counter electrode comprises a flexible conducting substrate film having a coating film of an electrode material. Said conducting substrate film can be of the same composition in both electrodes or it can be of a different composition. The thickness of each of the conductive substrate films may be from 75 μm to 175 μm.

The conducting substrate is made of a flexible transparent film consisting of:
a transparent conducting polymer, or
a non conducting polymer film having a transparent conducting coating which may be a transparent oxide coating or a metal coating, or
a metal grid, or
or a combination of these.

The transparent conducting coating is preferably a film of a transparent conducting oxide (TCO), selected from tin doped indium oxide (designated by ITO), As doped zinc oxide (designated by AZO), Ga doped zinc oxide (designated by GZO), Sn doped zinc oxide (designated by TZO), Si doped zinc oxide (SZO), or a fluorine doped tin oxide (designated by FTO).

The transparent non conducting polymer part of the conducting substrate can be selected from polyesters such as for example polyethylene terephtalate (PET) or polyethylene naphtalate (PEN), polyacrylates such as polymethylmethacrylate (PMMA), aromatic or aliphatic polycarbonates, or polyimides. PET is preferred.

The transparent conducting polymer forming the conducting substrate can be selected from poly(XDOT), XDOT being a 3,4-alkylene dioxythiophene monomer optionally having a substituent on a carbon of the alkylene group. Preferred monomers are those wherein the alkylene group is an ethylene group or a propylene group.

It is advantageous to use a substrate film which has a low sheet resistance. High value sheet resistance means slow response of the ECD. For instance, for a substrate surface lower than 0.1 $m^2$, the sheet resistance may be up to 60 Ω/sq. For larger surfaces, the upper limit of the sheet resistance should be lower. Determination of the sheet resistance upper values depending on the surface of the substrate can be made by the skilled person. Commercially available substrate films can be used.

The thickness of the working electrode active material film may from 100 nm to 500 nm. The active material in the working electrode is a polymer P(XDOT) having repeat units of general formula (I)

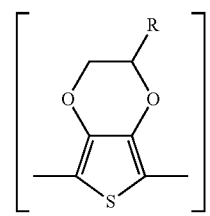

wherein R is —$CH_2OR'$, R' being selected from the following groups: —H, —R", —(C═O)NH—R" or —(C═O)—R", R" being an alkyl group or an alkenyl group having preferably 1 to 16 carbon atoms. Alkenyl groups having a terminal vinyl group are preferred.

When R is —$CH_2OR'$ with R' being an alkenyl group, the polymer has isomeric EDOT/ProDOT units. The EDOT unit has a —O-ethylene-O-group, and the PropOT unit has a —O-propylene-O— group.

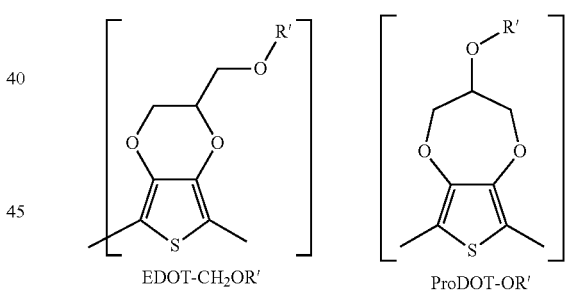

EDOT-$CH_2OR'$      ProDOT-OR'

Preferred examples of polymers which have isomeric units correspond to formula (I) wherein R' is —$(CH_2)_n$—CH═$CH_2$, with 1≤n≤14. The monomers wherein R' is —$CH_2$—CH═$CH_2$ or —$(CH_2)_4$—CH═$CH_2$ are particularly preferred. The EDOT/ProDOT ratio is preferably higher than 70:30. A ratio of about 95:5 is particularly preferred for a monomer (I) in which R is —$CH_2OR'$ with R' being —$(CH_2)_4$—CH═$CH_2$ group.

Units of formula (I) wherein R is not —H or a —$CH_2OR'$ group wherein R' is an alkenyl group provide polymers with no isomeric units. Examples of such R' groups are —$(CH_2)_5$—$CH_3$, —(C═O)NH—$CH_2$—CH═$CH_2$, —(C═O)NH—$(CH_2)_2$—CH═$CH_2$ and —(C═O)$(CH_2)_8$—CH═$CH_2$.

A working electrode according to certain embodiments of the disclosure has a reversible charge capacity typically in the range of 1 to 10 mC/$cm^2$ in a $LiClO_4$/polycarbonate electrolyte.

The counter electrode comprises a transparent conducting substrate coated by a film of an active material. The thickness of the counter electrode active material film may vary from 100 nm to 500 nm.

The active material in the counter electrode is selected from hexacyanometallates of various metals, [preferably $Fe^{II}/Fe^{III}$ hexacyanoferrate (generally known as Prussian Blue) or In hexacyanometallate], or from transition metal oxides (for instance $V_2O_5$, $NiO_xLiFePO_4$, $H_xIrO_2$, $Li_4Ti_5O_{12}$ or $TiO_2$). In a preferred mode, the active material is material is Prussian Blue, more preferably in the form of nanoparticles. Nanoparticles have an average primary particle size of from 1 to 100 nm, preferably from 10 to 50 nm.

The electrochromic device may have a thickness of 170 µm to 400 µm. A conductive substrate film made of a non conductive polymer film having a TCO coating may have a thickness of 75 µm to 175 µm. The active electrode material films may have a thickness of 100 nm to 500 nm. The electrolyte film may have a thickness of 1 µm to 100 µm, preferably 25 µm to 50 µm. The thickness of the device is adjusted considering the use and the mechanical properties required. The lowest device thickness leads to quite soft, paper-like devices, which may be beneficial for some uses. Moreover, a thinner conductive substrate film means higher transparency. Thicker films have higher mechanical stability. The combination 125µ (conducting substrate)/0.1µ (active electrode material)/50µ (electrolyte)/0.1µ (active electrode material)/125µ (conducting substrate) is preferred, as it shows good mechanical stability and low tendency to short circuits.

An advantage of certain embodiments of the electrochromic device of the disclosure is its larger surface, compared to known flexible electrochromic devices. For instance, an electrochromic device may be in the form of a multilayer film having a width of 300 mm or more, and a length of 150 m or more, that can be cut to the desired size.

A method for manufacturing certain embodiments of the working electrode comprises the following steps:
  providing a conducting substrate made of a flexible transparent conducting material film;
  providing a liquid composition containing one or more monomers selected from monomers of formula (II), said monomer(s) being dissolved in a solvent;
  coating said liquid composition on the conducting substrate;
  treating the coated composition to polymerize the monomers.
wherein the monomer II is of formula

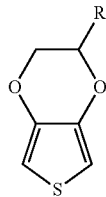

wherein R is —$CH_2OR'$, R' being selected from the following groups: —H, —R", —(C=O)NH—R" or —(C=O)—R", R" being an alkyl group or an alkenyl group having preferably 1 to 16 carbon atoms. Alkenyl groups having a terminal vinyl group are preferred.

A monomer (II) wherein R is R is —$CH_2OR'$ with R' being an alkenyl group is an isomeric mixture EDOT/ProDOT. The EDOT isomer has a —O-ethylene-O-group, and the PropOT isomer has a —O-propylene-O— group.

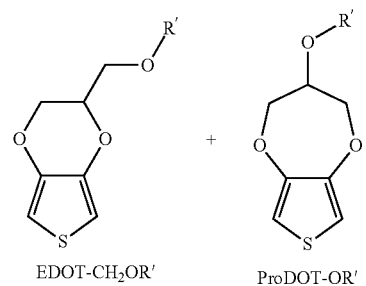

EDOT-$CH_2OR'$  ProDOT-OR'

Preferred examples of monomers which are an isomeric mixture of monomers correspond to formula (II) wherein R' is —$(CH_2)_n$—CH=$CH_2$, with $1 \leq n \leq 14$. The monomers wherein R' is —$CH_2$—CH=$CH_2$ or —$(CH_2)_4$—CH=$CH_2$ are particularly preferred. The EDOT/ProDOT ratio is preferably higher than 70:30. A ratio of about 95:5 is particularly preferred for a monomer (II) in which R is R is —H or R is —$CH_2OR'$ with R' being a —$(CH_2)_4$—CH=$CH_2$ group.

XDOT monomers which are available as pure monomers are of formula (II) wherein R is different from a —$CH_2OR'$ group wherein R' is an alkenyl group. Examples of R' groups providing pure XDOT monomers are —$(CH_2)_5$—$CH_3$, —(C=O)NH—$CH_2$—CH=$CH_2$, —(C=O)NH—$(CH_2)_2$—CH=$CH_2$ and —(C=O)$(CH_2)_8$—CH=$CH_2$.

PEDOT without side chains shows relatively strong absorption in the low energy part of the visible spectrum, i.e. from 550 to 700 nm and beyond. This is the so-called bipolaron absorption of the oxidized (doped) state of the polymer that causes the well-known sky-blue color of this material. Polymers obtained from the above mentioned side-chain modified monomers show less or a more flat absorption in this spectral range. This results in an attenuation or extinction of the color of the oxidized polymers, ideally to a full colorlessness. The latter is a necessary pre-requisite for many technical applications, such as smart dimmable windows.

In an aspect of the disclosure, the liquid composition used to prepare the working electrode is prepared by mixing the monomer(s) with one or more additional constituents useful as moderator bases, oxidizing agents, adhesion promoters, and solvents.

The addition of a moderator base is intended to control the kinetics of the polymerization reaction of monomer (II). Without using a moderator, the reaction proceeds too fast and a clear homogeneous film cannot be deposited. The moderator base is preferably an aliphatic amine or a mixture of aliphatic amines. The moderator base can be for example n-propylamine, 3-aminopropyltriethoxysilane or aminoethyl-aminopropyltrimethoxysilane.

The adhesion promoter is preferably an organofunctional silane. The adhesion promoter can be for example, 3-aminopropyltriethoxysilane, aminoethyl-aminopropyltrimethoxysilane, 3-mercaptopropyltrimethoxysilane and 3-glycidyloxypropyl trimethoxy silane.

It is noted that an amino silane may be used both as moderator base and adhesion promoter.

An oxidizing agent is intended to promote oxidative polymerization of the monomer (I). It can be iron tosylate for instance.

A solvent can be an aliphatic alcohol or a glycol for instance.

In an embodiment, the starting products are pre-cooled at a temperature in the range from −10° C. to −0° C., more preferably in the range from −30° C. to −10° C., and the mixture is maintained at that temperature in order to provide a working electrode composition in the form of a colloidal solution which has a potlife of at least one day.

The monomers (II) are polymerized by heat treatment. Polymerization in the presence of an oxidizing agent, which provides oxidative polymerization, is preferred.

The method for manufacturing the working electrode may comprise a preliminary step, in which the substrate film is activated by a Corona treatment or another plasma treatment, before the liquid composition containing the XDOT monomers is coated on said substrate film. A Corona treatment may be carried out for instance using an Arcotec Corona equipment, model CG06.

In an aspect of the disclosure, the liquid composition used to prepare the working electrode film is coated on the conducting substrate film by a continuous method, comprising slot die casting said composition on a conducting substrate film that is moved continuously under a slot die casting device, by a roll to roll device.

An example of a manufacturing system is represented schematically on FIG. 1, on which 1 is a first roll supporting the conducting substrate film to be coated, 2 is a second roll which supports the coated film (working electrode film), 3 is a Corona treatment zone, 4 are guide rollers, 5 is a slot die applicator, 6 is a thermostat, 7 is an in-situ polymerization zone, 8 is a thermal treatment device, 9 is a relaxation zone, and 10 are guide rollers.

When the substrate film is unwound from roll 1, driven through the system and wound on roll 2, the substrate film is Corona treated by device 3 to be activated and guided by rolls 4 up to a slot die applicator 5 (which contains the liquid working electrode composition) which is related with a thermostat 6. The film coated by means of the slot die applicator is then driven through the in-situ polymerization zone 7, where the wet film starts to polymerize, then through the thermal device 8 (which may be a tubular oven) where the oxidative polymerization is completed, and then through the relaxation zone 9 where it is relaxed/cooled to room temperature. Finally, the treated substrate is driven by rolls 10 on the end roll 2 on which it is wound.

The humidity level is adjusted between 25 and 40% rH in both the coating solution application step and in the in situ polymerization step. At humidity levels higher than 35-40% rH, condensation of water may occur during in situ polymerization, resulting in film haziness and poor film homogeneity. Humidity levels below 25% rH may result in insufficient hydrolysis of the adhesion promoter.

The wet film thickness may be adjusted to the desired value by adjusting delivery volume and speed of the substrate film through the system. The delivery volume can be adjusted by selection of the mask width of the slot die (for example between 10 μm and 20 μm) and/or by the pump. The speed might be from 0.67 m/min to 2 m/min.

The coated film obtained after the relaxation step generally contains residual monomers and side products from the polymerization reaction. The coated film may also contain excess oxidizing agent and side products thereof (e.g. toluene sulfonic acid if iron tosylate is used as the oxidizing agent). All these unwanted products have to be removed before the working electrode is used to assemble a full electrochromic device. The method thus comprises preferably an additional washing/rinsing/spraying step. The additional step can be done in a batch process on pieces cut to the desired size or, alternatively, in a continuous process using roll-to-roll machinery forwarding the film through a sequence of rinsing baths, optionally including spray nozzles. Water and aliphatic alcohols can be used for the rinsing baths, but most preferable are ethanol and n-butanol. The step of preparation of the coated films and the additional washing/rinsing/spraying step should be separated by at least one week in order to ensure the formation of durably adhering and mechanically stable polymer films (maturing process). If the rinsing is performed too early, films may partly or fully delaminate when getting in contact with the rinsing solution.

The optical properties (absorbance A or transmission T) of polymers PXDOT may be measured by optical absorption spectrometry using an optical cell transparent in the visible region (360-800 nm at least) equipped with three electrodes. The working electrode in this cell is the working electrode film to be characterized. The reference electrode is made of a noble metal (Ag, Pt, Au), or AgCl coated Ag wire calibrated in a 5 mM Ferrocene (Fc) solution. The counter electrode is made of a noble metal (Pt, Au) flag, mesh, gaze or wire. The cell is filled with a suitable electrolyte (e.g. 1 M $LiPF_6$ in propylene carbonate). The cell is sealed in a glove box in controlled atmosphere ($[O_2]$<10 ppm). The working electrode film is brought to the fully oxidized state by applying +1.1 V vs. $Fc/Fc^+$. If one of the properties A and T is determined by optical absorption spectrometry, the other property is calculated by the relation $A=\log_{10}T^{-1}$.

Optical characterization of the working electrode film is preferably carried out prior to a pre-conditioning treatment as described hereafter.

Pre-conditioning, i.e. reduction of the working electrode films, is beneficial in achieving full contrast and stability in the assembled devices. The pre-conditioning is performed either via an electrochemical batch method, or by chemical reduction, which may be carried out via a batch method or via an in-line method. Chemical pre-conditioning of the working electrode can be made using an amine compound as the reducing agent. An example is ethylene diamine which causes reduction of the working electrode material within some seconds.

The electrochemical pre-conditioning method is to be performed in dry atmosphere, i.e. a dry room. A working electrode sheet, as obtained after the rinsing step, is attached to a glass plate by adhesive tape, with the coated side up. The plate is then carefully placed in a three electrodes or two electrodes electrochemical cell of suitable dimensions.

The electrolyte in the pre-conditioning electrochemical cell may be a solution of a salt in a liquid solvent. The salt has an organic cation or a alkali metal cation, and an anion which may be selected for instance from perchlorate, hexafluorophosphate, tetrafluoroborate, or bis(trifluoromethane)sulfonimide anions. The organic cation may be selected for instance from tetrabutylammonium, or tetraethylammonium. The alkali metal cation is preferably a lithium cation. The liquid solvent is an aprotic polar organic liquid, preferably selected from anhydrous propylene carbonate, acetonitrile, or mixtures of ethylene carbonate/dimethyl carbonate.

The counter electrode in the pre-conditioning electrochemical cell may be formed of noble metal (Au, Pt) or carbon based (carbon cloth, graphite or glassy carbon) flag, mesh, or foil. The counter electrode may also be formed of lithium stripes or a lithium foil.

The reference electrode in the pre-conditioning electrochemical cell may be made of noble metal (Au, Pt) wire or stripe, silver or Ag/AgCl wire or stripe, or lithium wire or stripes. Furthermore, an $Ag/Ag^+$ reference electrode (Ag wire in presence of $Ag^+$ ions) can be used as reference electrode.

Employing a potentiostat, a number of potentiodynamic cycles (scan rate 20 mV/s) are performed by scanning the potential between 2.6 and 4.0 V vs. $Li^+/Li$ reference electrode. As a final step, a potential of 2.5 V vs. $Li^+/Li$ is applied to bring the working electrode to its reduced state. This final state may be achieved either after period of 130 sec applying said potential, or at a point where the current density is lower than $3\times10^{-4}$ mA/cm$^2$. The reduced working electrode film is then carefully removed, rinsed with ethanol, and dried with pressurized air. The rinsing/drying step is performed twice using a fresh ethanol bath each time.

The chemical pre-conditioning method may be performed by contacting the working electrode film with a solution of a reducing agent in a solvent. The reducing agent is preferably an amine, for example ethylenediamine, triethanolamine or trimethylamine. The solvent is for example an alkyl alcohol, preferably ethanol. The reducing agent concentration in the solution is preferably between 0.1 and 5%. The conducting polymer film is reduced by the solution within few seconds, and turns to an air-stable blue to violet state. The sheet is then carefully removed, dried and rinsed several times. Drying can be performed with pressurized air, and rinsing can be performed in an ethanol bath. In view of the high kinetics of the reducing reaction, the chemical pre-conditioning method can be performed either in a batch method, or in an in-line method. The pre-conditioned working electrode sheet is stored in a dry and dust-free atmosphere until assembly.

A counter electrode for certain embodiments of the electrochromic device of the present disclosure can be prepared by a method comprising the following steps:
  providing a substrate made of a flexible transparent conducting material film;
  providing a counter electrode composition containing a counter electrode active material; and
  coating said composition on the said substrate.

A method for manufacturing certain embodiments of the counter electrode may comprise a preliminary step, in which the substrate film is activated by a Corona treatment or another plasma treatment, before the liquid counter electrode composition is coated on said substrate film. The activation step is similar to that described above concerning the working electrode.

The active material in the counter electrode is selected from hexacyanometallates of various metals, [preferably $Fe^{II}/Fe^{III}$ hexacyanoferrate (generally known as Prussian Blue) or In hexacyanometallate] or precursors thereof, or from transition metal oxides (for instance $V_2O_5$, $NiO_x LiFePO_4$, $H_x IrO_2$, $Li_4Ti_5O_{12}$ or $TiO_2$). In a preferred mode, the active material is material is Prussian Blue, more preferably in the form of nanoparticles.

In a first embodiment, a counter electrode composition containing PB precursors is coated on the substrate by electrodeposition under a constant negative current density. The PB counter electrode composition has preferably a PB concentration of 0.05-0.5 M. It can be prepared by mixing a solution of a $Fe^{III}$ salt and a solution containing a ferricyanide precursor. The $Fe^{III}$ salt can be selected for instance from $Fe^{III}$ chloride, $Fe^{III}$ nitrate or $Fe^{III}$ sulfate. Optionally, a number of additives can be added to fine tune the properties (stability, conductivity) of the composition, such as, for instance, mineral acids or supporting electrolytes (preferably sodium or potassium salts). Electrodeposition can be advantageously performed as a semi-automated batch method.

The semi-automated batch method allows a high sample throughput, thus enabling the preparation of a large number of specially designed electrodes up to a size of approximately 30×40 cm$^2$ in a small period of time.

In a second embodiment, PB is deposited by an electroless method. In the electroless method, the counter electrode composition applied on the conducting substrate is preferably a stable suspension of Prussian Blue nanoparticles in a liquid support such a water, methanol, ethanol, mixtures thereof, or toluene. The method for preparing Prussian blue nanoparticles from aqueous mixtures of a $Fe^{3+}$ salt and $[Fe^{II}(CN)_6]_4^-$ or a $Fe^{2+}$ salt and $[Fe^{III}(CN)_6]_3^-$ is well known in the art. Reference can be made for instance to M. Kurihara et al. [Nanotechnology, 2007, 18, 345609] and to WO2006/087950 A1.

The electroless method to prepare a PB counter electrode can be implemented continuously. Using continuously roll-to-roll coated nano-PB counter electrodes results in much smaller response times as compared to electrodeposited PB electrodes. This is attributed to the higher inner surface/porosity of the nanoparticulate films.

Figure 2:
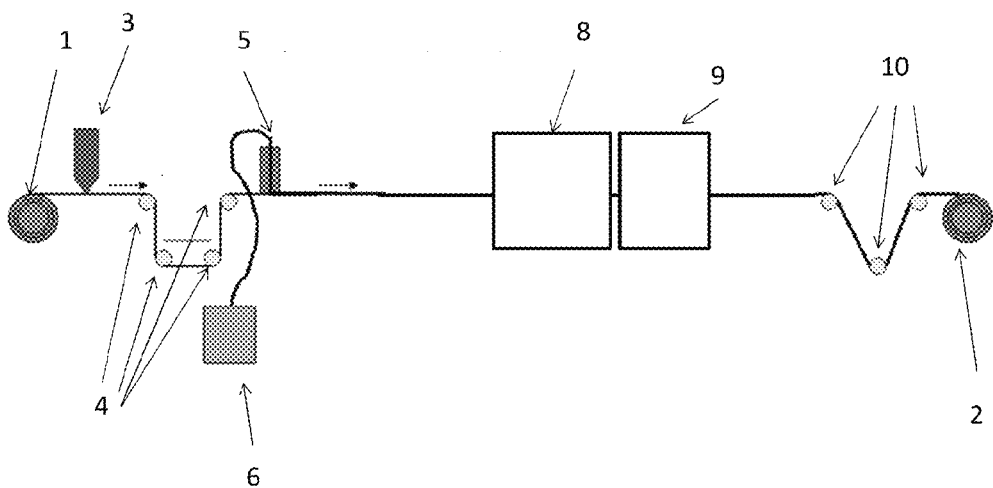
FIG. 2 shows an example of a continuous manufacturing system represented schematically.

An example of a continuous manufacturing system is represented schematically in FIG. 2, on which 1 is a first roll supporting the conducting substrate film to be coated, 2 is a second roll which supports the coated film (counter electrode film), 3 is a Corona treatment zone, 4 are guide rollers, 5 is a slot a die applicator, 6 is a thermostat, 8 is a thermal treatment device, 9 is a relaxation zone, and 10 are guide rollers. The relaxation zone is optional.

When the substrate film is unwound from roll 1, driven through the system and wound on roll 2, the substrate film is Corona treated by device 3 to be activated and guided by rolls 4 up to a slot die applicator 5 (which contains the liquid counter electrode composition) which is related with a thermostat 6. The film coated by means of the slot die applicator is driven through the thermal device 8 (which may be a tubular oven) to be heat treated preferably at a temperature in the range of 100-150° C. and then through the relaxation zone 9 where it is relaxed/cooled to room temperature. Finally, the treated substrate is driven by rolls 10 on the end roll 2 on which it is wound.

In an alternative embodiment, the PB composition is applied by a comma bar, by a knife system, or by gravure printing.

An electrolyte film is prepared by a method comprising the following steps:
  preparing a liquid electrolyte composition which contains a lithium salt, a cross-linkable solvating prepolymer;
  coating said electrolyte composition on an a surface of a substrate film;
  submitting the coated substrate film to a cross-linking treatment.

The liquid electrolyte composition may contain optionally contain an ionic liquid.

The substrate film can be a polymer film on which the electrolyte film is formed, and from which it is peeled off after drying and cross-linking, in order to obtain a free standing film which is afterwards assembled with the electrodes. An example of a polymer for the substrate film is polypropylene.

In a preferred mode, the substrate film on which the electrolyte composition is coated is the active material coating of an electrode, thus forming a half cell. This mode is advantageous because it avoids handling the electrolyte film.

The electrolyte composition can be coated on the substrate film continuously by various methods, such as the comma bar method, the doctor blade method or slot die casting. Slot die casting if preferred. An in line method wherein the substrate film is driven by a roll to roll device and the electrolyte liquid composition is applied by slot die casting is particularly preferred.

The cross-linkable prepolymer used for the preparation on the electrolyte composition is preferably a branched polyether having cross-linkable end groups or a linear polyether having a cross-linkable end group on side groups. The polyether forming the linear polyether or the branches of the branched polyether is preferably made of repeat units —O—CH$_2$CHR$^5$— wherein R$^5$ is H, or R$^5$ is a selected from CH$_3$, CH$_2$CH$_3$ and cross-linkable groups. The crosslinkable groups are preferably vinyl groups, acrylate groups or methacrylate groups. At least part of the R$^5$ groups are crosslinkable groups.

The molecular weight of the crosslinked polymer is generally higher than 2500, and preferably in the range of 2500-10$^7$.

If the prepolymer is a solid prepolymer, the liquid electrolyte composition to be coated on a substrate is prepared by dissolving the solid prepolymer in a low boiling point solvent, and the method for the preparation of the electrolyte film comprises a further step of drying, which is carried out prior to the cross-linking treatment. The solvent can be any low boiling point organic liquid conventionally used as a solvent, in which the cross-linkable polymer can be dissolved. Examples of solvents are acetonitrile and toluene.

In an embodiment, the prepolymer is a 4 branch polyether in which each branch is an ethylene oxide/propylene oxide copolymer and at least 2 branches have an end group (preferably an acrylate group) which allows crosslinking.

In another embodiment, the prepolymer is an ethylene oxide/butylene oxide copolymer having vinyl side groups, said copolymer being solid at a molecular weight of about 100 000.

Cross linking of the prepolymer may be made by UV irradiation, by a thermal treatment, or by an electron beam. If crosslinking is carried out by UV irradiation or by a thermal treatment, the liquid electrolyte composition contains in addition a thermo- or UV initiator. The initiator can be a ketone, a peroxide, a persulfate, or an azo compound, or a combination of different initiators. Commercially available initiators are Esacure KT046® and Irgacure 61®. Esacure KT046® is a mixture of 2,4,6 trimethylbenzoyl diphenyl phosphine oxide, 2-hydroxy-2-methyl-1-phenyl-propanone and oligo(2-hydroxy-2-methyl-1-(4-(1-methylvinyl)phenyl)propanone). Irgacure 651® is solid powder of 2,2-Dimethoxy-1,2-diphenylethan-1-one.

The solvent can be any low boiling point organic liquid conventionally used as a solvent, in which the cross-linkable polymer can be dissolved. Examples of solvents are acetonitrile and toluene.

Furthermore, the liquid electrolyte may contain a high boiling point organic solvent as a plasticizing agent. Examples are propylene carbonate, ethylene carbonate, vinyl carbonate, γ-butyrolactone and n-methylpyrrolidone An ionic liquid may also act as a plasticizing agent and as an ionic conductor.

In an embodiment, the liquid electrolyte composition contains an ionic liquid, as mentioned above. Said ionic liquid improves the wettability of the surface of the electrolyte film and prevents shrinking, and furthermore acts as a plasticizing agent.

In a specific mode, the liquid electrolyte composition to be coated on a substrate is obtained by dissolving in a low boiling solvent (LBPS), a mixture A that contains a solid cross-linkable polymer (70-85 weight %), a lithium salt (15-30 weight %), optionally a cross linking agent (up to 5 weight %), optionally an ionic liquid (up to 30 weight %), the weight ratio "mixture A": LBPS being of 10% to 70%.

In another embodiment, the liquid electrolyte composition to be coated on a substrate is obtained by mixing a liquid polymer (70-85 weight %), a lithium salt (15-30 weight %), optionally a cross linking agent (up to 5 weight %), optionally an ionic liquid (up to 30 weight %), and optionally a high boiling point solvent acting as a plasticizing agent (up to 10 weight %)

Figure 3A:
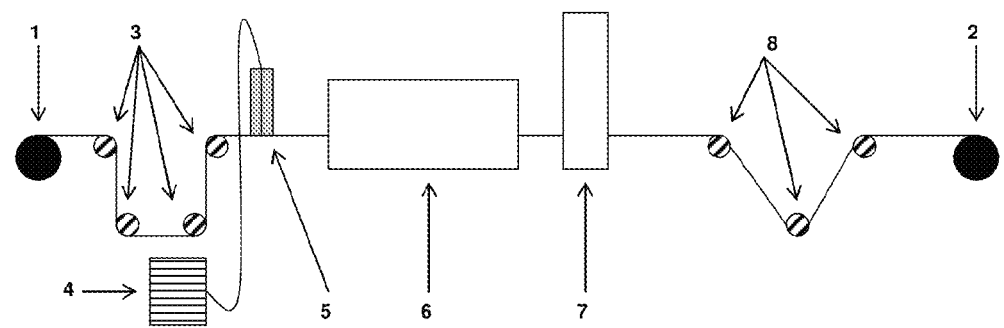
FIG. 3a shows a coating device which can be used to coat a liquid electrolyte composition on a substrate according to an in-line method.

A coating device which can be used to coat a liquid electrolyte composition on a substrate according to an in-line method is represented on FIG. 3a, on which 1 is a first roll supporting the substrate film to be coated, 2 is a second roll which supports the coated film (substrate film+electrolyte film), 3 are guide rollers, 4 is a pumping and reservoir system, 5 is a slot die applicator, 6 is a drying section, 7 is a cross-linking section, and 8 are guide rollers.

The components of certain embodiments of the electrochromic device of the disclosure can be assembled by various methods. A preferred method comprises a step of a colamination. In an advantageous embodiment, the electrolyte composition is coated on the active surface of one of the electrodes thus forming a half cell, and said half cell is then assembled with the other electrode by colamination. The polymer of the electrolyte film can be submitted to crosslinking before or after assembling the half cell and the second electrode.

Figure 3B:
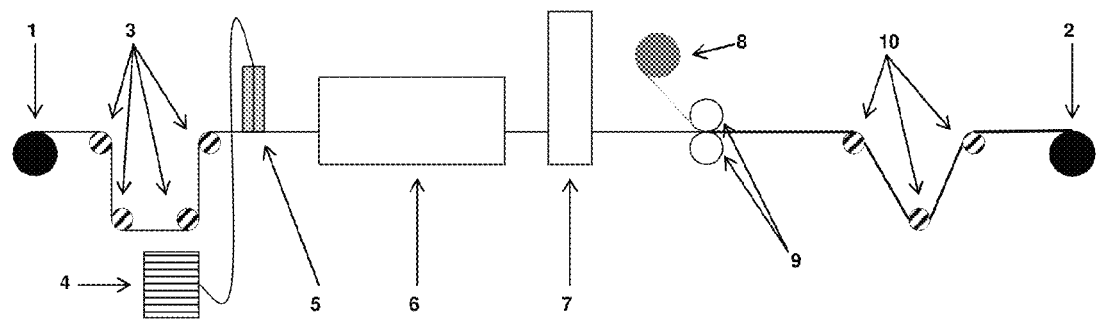
FIG. 3b shows a device, which can be used to assemble an ECD via an inline method comprising a colamination step, represented schematically FIG. 4 displays cyclovoltammogramms (CV) of two samples.

A device, which can be used to assemble an ECD via an inline method comprising a colamination step is represented schematically in FIG. 3b. In FIG. 3b, 1 is a first roll supporting a first electrode film which is to be coated by the electrolyte composition, 2 is a second roll which supports the complete ECD (first electrode+electrolyte film+second electrode film), 3 are guide rollers, 4 is a pumping and reservoir system for the liquid electrolyte composition, 5 is a slot die applicator, 6 is a drying section (optional), 7 is a cross-linking section, 8 is a roll supporting the second electrode on an intermediate substrate film, 9 are lamination rolls and 10 are guide rollers. The drying section and cross-linking section may also be positioned after the lamination rolls 9.

In an embodiment, the half cell and the second electrode are laminated together between 2 rolls with a pressure in the range 1 to 50 kg/cm$^2$. In a specific embodiment, they are laminated with an offset of 1 cm in both perpendicular direction to allow electric contacting.

EXAMPLES

Embodiments of the present disclosure are more particularly described in the following examples, which are intended as illustrative only. Various modifications will be apparent to those skilled in the art.

Comparative Example 1a (EDOT/ProDOT) Composition 4.26 g of an EDOT/ProDOT isomeric mixture (CLEVIOS M V2® provided by Heraeus) are mixed with 11.13 g n-butanol, 0.51 g of imidazole, 0.66 g of 3-aminopropyl triethoxysilane, and 29.88 g of a solution of water-free iron(III) tosylate in n-butanol (Clevios C-B 40® provided by Heraeus). The mixture is diluted with another 7.50 g of n-butanol and filled in a glass bottle with screw-cap and a suitable grommet.

Prior to mixing, all components are pre-cooled to −30° C. in a thermostat. Immediately after mixing, the mixture is vigorously stirred for one minute and then held at −30° C. Under these conditions, a ready-to-apply colloidal solution (total amount 53.94 g) with a potlife of at least one day is formed that is used for further processing.

Example 1b

EDOT-CH$_2$OH Composition 12.91 g of pure EDOT-CH$_2$OH (from COC Ltd.) are mixed with 27.80 g of n-butanol, 3.32 g of n-propylamine, 1.49 g of 3-aminopropyl triethoxysilane, and 186.88 g of a solution of water-free iron(III) tosylate in n-butanol (Clevios C-B 40® from Heraeus). The mixture is diluted with another 11.25 g of n-butanol and filled in a glass bottle with screw-cap and a suitable grommet.

Prior to mixing, all components are pre-cooled to −30° C. in a thermostat. Immediately after mixing, the mixture is vigorously stirred for one minute and then held at −30° C., to obtain a ready-to-apply colloidal solution with a potlife of at least one day.

Example 1c

EDOT-CH$_2$O—(C═O)NH—CH$_2$—CH═CH$_2$ Composition 19.15 g of pure EDOT-CH$_2$O—(C═O)NH—CH$_2$—CH═CH$_2$ (from COC Ltd.) are mixed with 27.80 g of n-butanol, 3.32 g of n-propylamine, 1.49 g of 3-aminopropyl triethoxysilane, and 186.88 g of a solution of water-free iron (III) tosylate in n-butanol (Clevios C-B 40® from Heraeus). The mixture is diluted with another 121.50 g of n-butanol and filled in a glass bottle with screw-cap and a suitable grommet.

Prior to mixing, all components are pre-cooled to −10° C. in a thermostat. Immediately after mixing, the mixture is vigorously stirred for one minute and then held at −10° C., to obtain a ready-to-apply colloidal solution with a potlife of at least one day.

Example 1d

(EDOT-CH$_2$O—C$_6$H$_{11}$/PropOT-O—C$_6$H$_{11}$) Composition 12.71 g of an EDOT-CH$_2$O—C$_6$H$_{11}$/PropOT-O—C$_6$H$_{11}$ isomeric mixture (from COC Ltd.) are mixed with 18.53 g of n-butanol, 2.22 g of n-propylamine, 0.99 g of 3-aminopropyl triethoxysilane, and 124.58 g of a solution of water-free iron (III) tosylate in n-butanol (Clevios C-B 40® from Heraeus). The mixture is diluted with another 81.00 g of n-butanol and filled in a glass bottle with screw-cap and a suitable grommet.

Prior to mixing, all components are pre-cooled to −10° C. in a thermostat. Immediately after mixing, the mixture is vigorously stirred for one minute and then held at −10° C., to obtain a ready-to-apply colloidal solution with a potlife of at least one day.

Example 1e

EDOT-CH$_2$O—(CH$_2$)$_5$—CH$_3$ Composition 19.23 g of pure EDOT-CH$_2$O—(CH$_2$)$_5$—CH$_3$ (from COC Ltd.) are mixed with 27.80 g of n-butanol, 3.32 g of n-propylamine, 1.49 g of 3-aminopropyl triethoxysilane, and 186.88 g of a solution of water-free iron(III) tosylate in n-butanol (Clevios C-B 40® from Heraeus). The mixture is diluted with another 121.50 g of n-butanol and filled in a glass bottle with screw-cap and a suitable grommet.

Prior to mixing, all components are pre-cooled to −10° C. in a thermostat. Immediately after mixing, the mixture is vigorously stirred for one minute and then held at −10° C., to obtain a ready-to-apply colloidal solution with a potlife of at least one day.

Example 1f

EDOT-CH$_2$O—(C═O)—(CH$_2$)$_8$—CH═CH$_2$ Composition 16.92 g of pure EDOT-CH$_2$O—(C═O)—(CH$_2$)$_8$—CH═CH$_2$ (from COC Ltd.) are mixed with 18.53 g of n-butanol, 2.22 g of n-propylamine, 0.99 g of 3-aminopropyl triethoxysilane, and 124.58 g of a solution of water-free iron (III) tosylate in n-butanol (Clevios C-B 40® from Heraeus). The mixture is diluted with another 155.00 g of n-butanol and filled in a glass bottle with screw-cap and a suitable grommet.

The components do not have to be pre-cooled. After mixing, the mixture is vigorously stirred for one minute and held at room temperature to obtain a ready-to-apply colloidal solution with a potlife of at least one day.

Comparative Example 2a

Manufacturing a Working Electrode Film

A conducting plastic film roll, provided by CP Films/Solutia, Inc., is used as the conducting substrate. It is a PET-ITO film having a thickness of 125 μm, a width of 305 mm and a length of 150 meters, on 6" paper core (herein also referred to as 'web'). The sheet resistance is 60 Ω/sq.

The device used to manufacture the working electrode is a Click&Coat® modular line, provided by Coatema Coating Machinery GmbH. It is schematically represented in FIG. 1.

The cooled working electrode solution from Example 1a is used as the liquid working electrode composition.

The conducting substrate is inserted in the Click&Coat® modular line where it is first continuously activated by in-line Corona treatment with an ARCOTEC Corona equipment, model CG06, 20% of full power).

The liquid working electrode composition is transferred to a slot die 5 by means of a micro annular gear pump and applied to the activated substrate surface, resulting in a wet film, which is transferred to part 7.

In part 7 of the modular line, which is an "in situ polymerization" compartment the length of which is 2 m (ISP compartment), polymerization of the monomer starts at room temperature. In part 8, which is a 2 m long oven, polymerization is completed. In the further 3 m long relaxation line 9, the polymer is relaxed and cooled down to room temperature.

Several samples were prepared according to the above method, with various combinations of mask widths for the slot die and web speed, which provided various delivery volumes. The conducting plastic film was driven through the device, and each combination of conditions was maintained over a length of at least 3 m. For each combination, a sample was cut out after the final step. Table 1 shows the operating conditions, the resulting delivery volume, and the corresponding calculated wet film thickness.

TABLE 1

| Trial No | mask width [μm] | Web speed [m/min] | delivery volume [ml/min] | calculated wet film thickness [μm] |
|---|---|---|---|---|
| TCM18A | 10 | 1.0 | 2.0 | 6.67 |
| TCM18B | 10 | 1.2 | 2.0 | 5.56 |

TABLE 1-continued

| Trial No | mask width [μm] | Web speed [m/min] | delivery volume [ml/min] | calculated wet film thickness [μm] |
|---|---|---|---|---|
| TCM18C | 10 | 2.0 | 4.0 | 6.67 |
| TCM19 | 10 | 0.6 | 1.0 | 5.56 |

For each sample, the wet film is allowed to warm, level and pre-polymerize at room temperature in the so-called ISP compartment having a length of 2 m (corresponding to a pre-polymerization time of 1.67-3.33 min, depending on the web speed, see Table 1) and then dried at 100° C. in the oven (corresponding to a drying time of 1.67-3.33 min, depending on the web speed (see Table 1). A longer drying time is feasible and can be useful to improve the film adhesion.

The humidity level is adjusted between 20 and 40% rH, preferably between 25 and 35% rH in both the solution application and ISP sections.

After oven drying, the coated film is allowed to relax at room temperature in the relaxation zone 9 of the manufacturing line.

The film is then re-wound with low tension using a protective polyethylene film and stored under ambient conditions.

Working Electrode Characterization

Electrochemical stability of the working electrode (sample TCM 18B obtained in the present example) has been characterized by cyclovoltammometry, using a 1 M $LiClO_4$ in propylene carbonate solution as the electrolyte. Cyclovoltammometry was performed in the center of the film and on the edge.

Sample TCM18B is rinsed prior to characterization, according to the following method. A flat stainless steel tub 40×50×5 $cm^2$ in size (w×l×h) is filled with n-butanol up to a filling level of 2 cm. Sample TCM18B is carefully immersed in the butanol bath until all the surface is covered. It is then carefully removed and dried with pressurized air. This step is repeated until any stains of oxidizer or other reaction products are no longer visible by the naked eye. Finally, the sheet is rinsed with butanol and dried with pressurized air. The rinsed sheet can be stored, layered between sheets of polyethylene protective film in a dry and dark place. A flat polyethylene tube could be used in place of the flat stainless steel tub.

Figure 4:
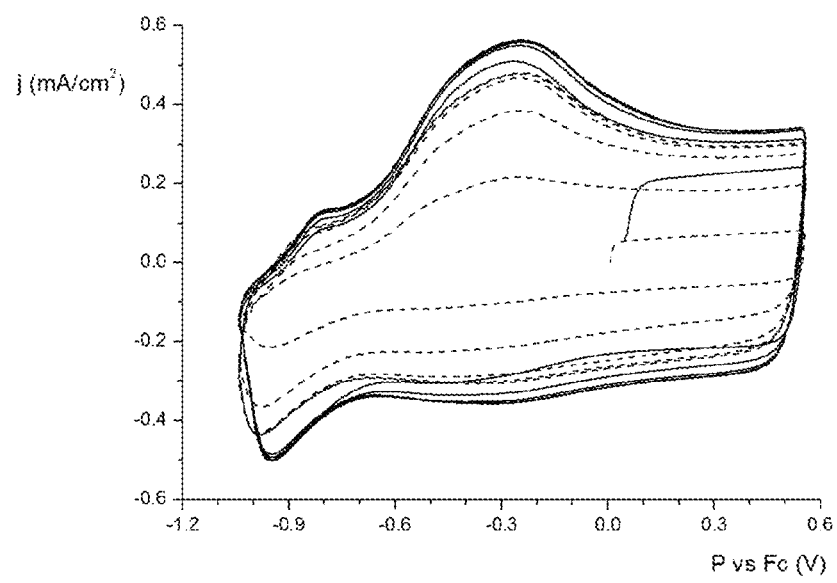

FIG. 4 displays cyclovoltammogramms (CV) of the two samples. Curves represented by dotted line _ _ _ are related to edge capacity, and curves represented by straight line —— are related to center capacity. j is the current density, in $mA/cm^2$. P is the potential vs Fc (V). Fc designates the ferrocene/ferrocenium couple $Fc/Fc^+$.

The electrochemical stability is reached after few cycles in the chosen potential range (−1 to 0.6 V vs. $Fc/Fc^+$). The CVs show a reversible capacity change respectively of 7.3 $mC/cm^2$ and 8.3 $mC/cm^2$, measured for the electrodes after rinsing.

The optical absorbance of sample TCM 18B is measured by optical absorption spectrometry using an optical cell transparent in the visible region (360-800 nm at least) equipped with 3 electrodes. The working electrode in this cell is the working electrode film to be characterized. Both the reference electrode and the counter electrode are Pt electrodes. The electrolyte in the cell is a 1 M $LiPF_6$ in propylene carbonate solution. The cell is sealed in a glove box in controlled atmosphere ($[O_2]$<10 ppm). The working electrode film is brought to the fully oxidized state by applying +1.1 V vs. $Fc/Fc^+$.

Figure 5:
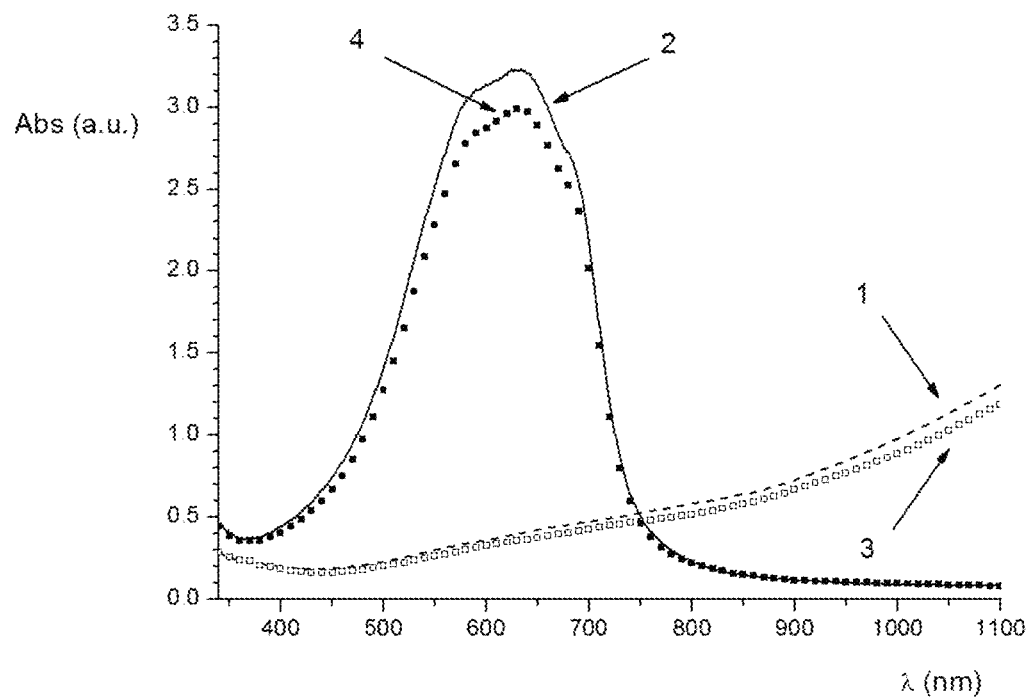
FIG. 5 displays optical absorbance spectra.

The optical absorbance spectra are represented in FIG. 5. Curves 1-4 represent respectively: 1) the edge oxidized state; (2): the edge neutral state; (3) the center oxidized state; (4) the center neutral state.

Neutral state corresponds to −1.04 V vs Fc and to $\lambda_{max}$ of 633 nm. Oxidized state corresponds to 0.56 V vs Fc.

Example 2b

Manufacturing a Working Electrode Film

A conducting plastic film roll, provided by CP Films/Solutia, Inc., is used as the conducting substrate. It is a PET-ITO film having a thickness of 125 μm, a width of 305 mm and a length of 150 meters, on 6" paper core (herein also referred to as 'web'). The sheet resistance is 60 Ω/sq.

The device used to manufacture the working electrode is a Click&Coat® modular line, provided by Coatema Coating Machinery GmbH. It is schematically represented in FIG. 1.

The cooled working electrode solution from Example 1b is used as the liquid working electrode composition.

The conducting substrate is inserted in the Click&Coat® modular line where it is first continuously activated by in-line Corona treatment with an ARCOTEC Corona equipment (model CG06, 20% of full power).

The liquid working electrode composition is transferred to a slot die 5 by means of a micro annular gear pump and applied to the activated substrate surface, resulting in a wet film, which is transferred to part 7.

In part 7 of the modular line, which is an "in situ polymerization" compartment the length of which is 2 m (ISP compartment), polymerization of the monomer starts at room temperature. In part 8, which is a 2 m long oven, polymerization is completed. In the further 3 m long relaxation line 9, the polymer is relaxed and cooled down to room temperature.

Several samples were prepared according to the above method, with various combinations of mask widths for the slot die and web speed, which provided various delivery volumes. The conducting plastic film was driven through the device, and each combination of conditions was maintained over a length of at least 3 m. For each combination, a sample was cut out after the final step.

Table 2 shows the operating conditions, the resulting delivery volume, and the corresponding calculated wet film thickness.

TABLE 2

| Trial No. | mask width [μm] | Web speed [m/min] | delivery volume [ml/min] | calculated wet film thickness [μm] |
|---|---|---|---|---|
| TCM74A | 30 | 0.67 | 1 | 4.98 |
| TCM74B | 30 | 0.67 | 1.5 | 7.46 |
| TCM74C | 30 | 0.67 | 1.75 | 8.71 |
| TCM74D | 30 | 0.67 | 2 | 9.95 |

For each sample, the wet film was allowed to warm, level and pre-polymerize at room temperature in the so-called ISP compartment having a length of 3.3 m (corresponding to a pre-polymerization time of 4.9 min at a web speed of 0.67 m/min) and then dried at 120° C. in the oven (corresponding to a drying time of 3.0 min at a web speed of 0.67 m/min).

Here again, a longer drying time is feasible and can be useful to improve the film adhesion, and the humidity level is adjusted between 20 and 35% rH in both the solution application and ISP compartments.

After oven drying, the coated film is allowed to relax at room temperature in the relaxation zone 9. The film is then re-wound with low tension using a protective polyethylene film and stored under ambient conditions.

Working Electrode Characterization

Electrochemical stability of the working electrode (sample TCM74C obtained in the present example) has been characterized by cyclovoltammometry, using a 1 M LiClO$_4$ in propylene carbonate solution as the electrolyte.

Sample TCM74C was rinsed prior to characterization, according to the following method. A flat stainless steel tub 40×50×5 cm$^2$ in size (w×l×h) is filled with n-butanol up to a filling level of 2 cm. Sample TCM74C is carefully immersed in the butanol bath until all the surface is covered. It is then carefully removed and dried with pressurized air. This step is repeated until any stains of oxidizer or other reaction products are no longer visible by the naked eye. Finally, the sheet is rinsed with butanol and dried with pressurized air. The rinsed sheet can be stored, layered between sheets of polyethylene protective film in a dry and dark place. A flat polyethylene tube could be used in place of the flat stainless steel tub.

Cyclovoltammometry was performed in the center part of the film.

Figure 6:
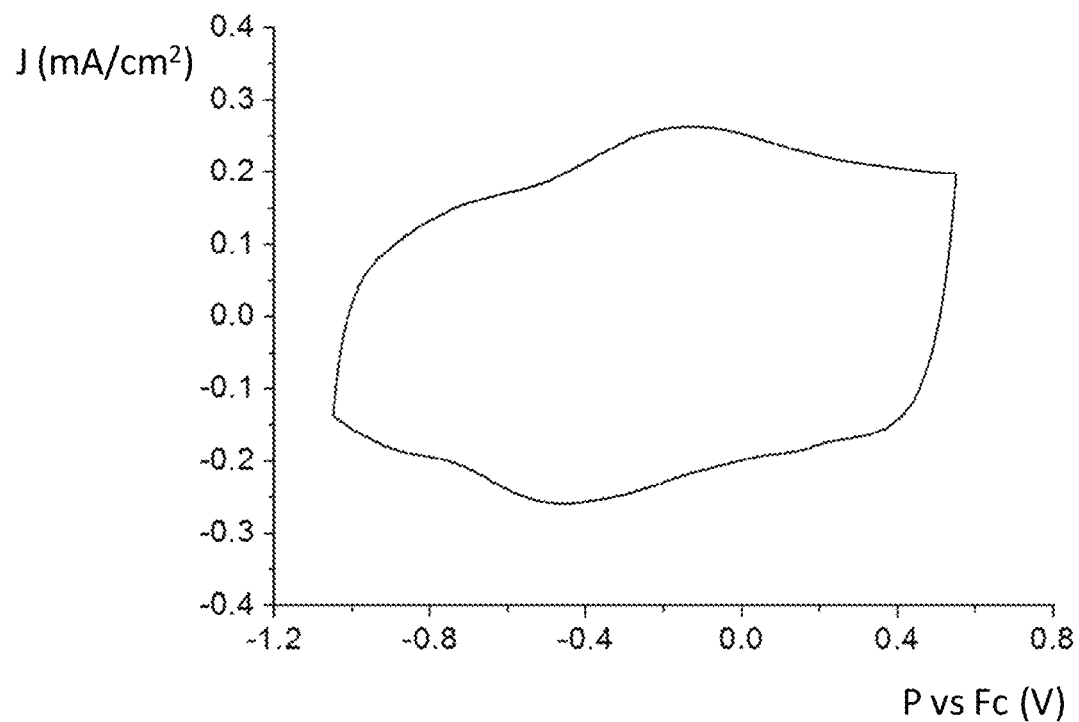
FIG. 6 displays the cyclovoltammogramm on which j represents the current density (in mA/cm2), and P vs Fc (in V) represents the potential vs the ferrocene/ferrocenium couple Fc/Fc+.

FIG. 6 displays the cyclovoltammogramm on which j represents the current density (in mA/cm$^2$), and P vs Fc (in V) represents the potential vs the ferrocene/ferrocenium couple Fc/Fc$^+$.

The electrochemical stability is reached after few cycles in the chosen potential range (−1 to 0.6 V vs Fc). The cyclic voltammetry plot represented in FIG. 6 shows the thin film reversible redox system. The charge density is 6.2 mC/cm$^2$.

Figure 7:
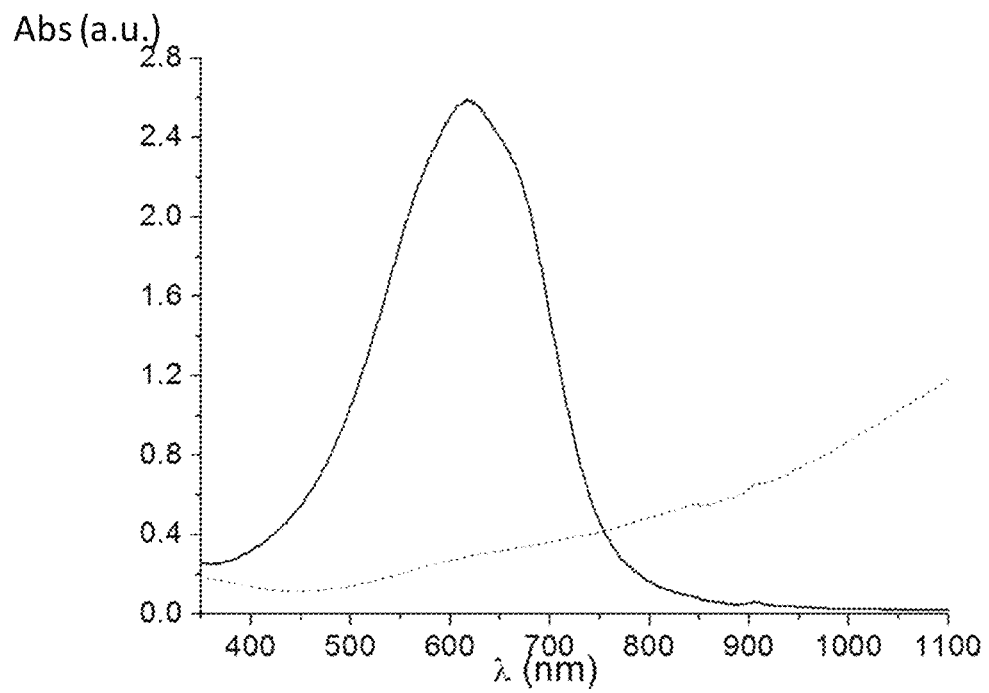
FIG. 7 displays the spectra of the neutral state (straight line) and of the oxidized (dotted line) states.

The optical absorbance of sample TCM74C is measured by optical absorption spectrometry according to the method of example 2a. The measurement was performed in the center part of the film. The spectra of the neutral state (straight line) and of the oxidized (dotted line) states are given in FIG. 7.

The TCM74C sample shows a high degree of polymerization. The layer is thick, the absorbance in the colored state is high enabling the manufacture of ECDs with very low optical transmittance in the dark state.

|  | | $\lambda_{max}$ | T % at $\lambda_{max}$ | | Contrast |
|---|---|---|---|---|---|
|  | Position | [nm] | Bleached | Colored | [%] |
| TCM74C | Center | 617 | 52 | (0.3) | 52 |

Example 2c

Manufacturing a Working Electrode Film

Several samples were prepared according to the method described in Example 2b, using the cooled solution of Example 1c, with various delivery volumes at fixed mask width (30 μm) for the slot die and fixed web speed (0.67 m/min).

Table 3 shows the operating conditions, the resulting delivery volume, and the corresponding calculated wet film thickness.

TABLE 3

| Trial No. | mask width [μm] | Web speed [m/min] | delivery volume [ml/min] | calculated wet film thickness [μm] |
|---|---|---|---|---|
| TCM71A | 30 | 0.67 | 1 | 4.98 |
| TCM71B | 30 | 0.67 | 1.5 | 7.46 |
| TCM71C | 30 | 0.67 | 1.75 | 8.71 |
| TCM71D | 30 | 0.67 | 2 | 9.95 |

For each sample, the wet film was allowed to warm, level and pre-polymerize at room temperature in the so-called ISP compartment having a length of 3.3 m (corresponding to a pre-polymerization time of 4.9 min at a web speed of 0.67 m/min) and then dried at 120° C. in the oven (corresponding to drying time of 3.0 min at a web speed of 0.67 m/min).

Here again, a longer drying time is feasible and can be useful to improve the film adhesion, and the humidity level is adjusted between 20 and 35% rH in both the solution application and ISP compartments.

After oven drying, the coated film is allowed to relax at room temperature in the relaxation zone 9. The film is then re-wound with low tension using a protective polyethylene film and stored under ambient conditions.

Working Electrode Characterization

Electrochemical stability of the working electrode (sample TCM71C obtained in the present example) has been characterized by cyclovoltammometry, using a 1 M LiClO$_4$ in propylene carbonate solution as the electrolyte. Sample TCM71C was rinsed prior to characterization, according to the method of example 2b. Cyclovoltammometry was performed in the center part of the film.

Figure 8:
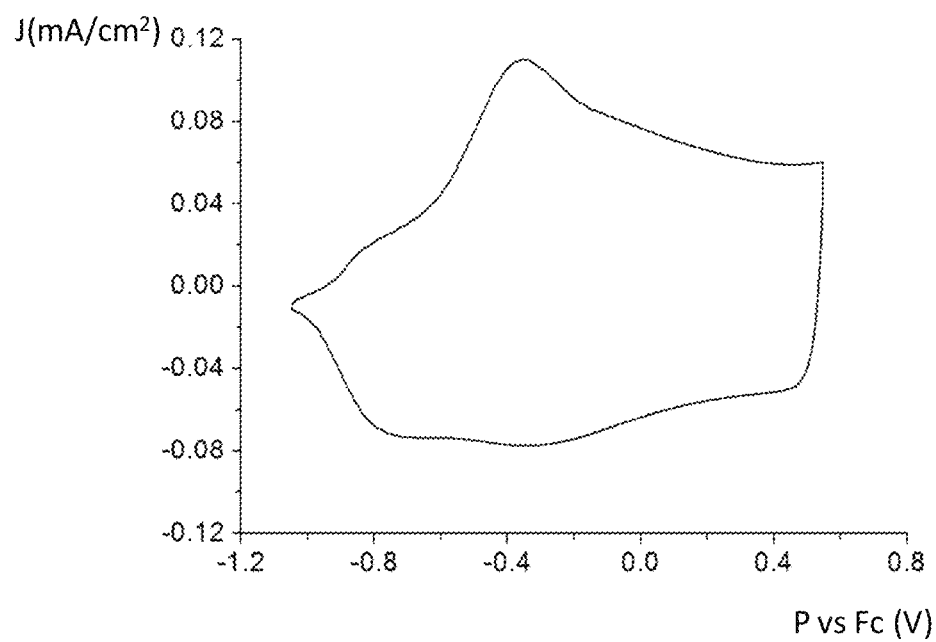
FIG. 8 displays the cyclovoltammogramm on which j represents the current density (in mA/cm2), and P vs Fc (in V) represents the potential vs the ferrocene/ferrocenium couple Fc/Fc+.

FIG. 8 displays the cyclovoltammogramm on which j represents the current density (in mA/cm$^2$), and P vs Fc (in V) represents the potential vs the ferrocene/ferrocenium couple Fc/Fc$^+$.

The electrochemical stability is reached after few cycles in the chosen potential range (−1 to 0.6 V vs Fc). The cyclic voltammetry plot represented in FIG. 8 shows the thin film reversible redox system. The charge density is 4.1 mC/cm$^2$.

Figure 9:
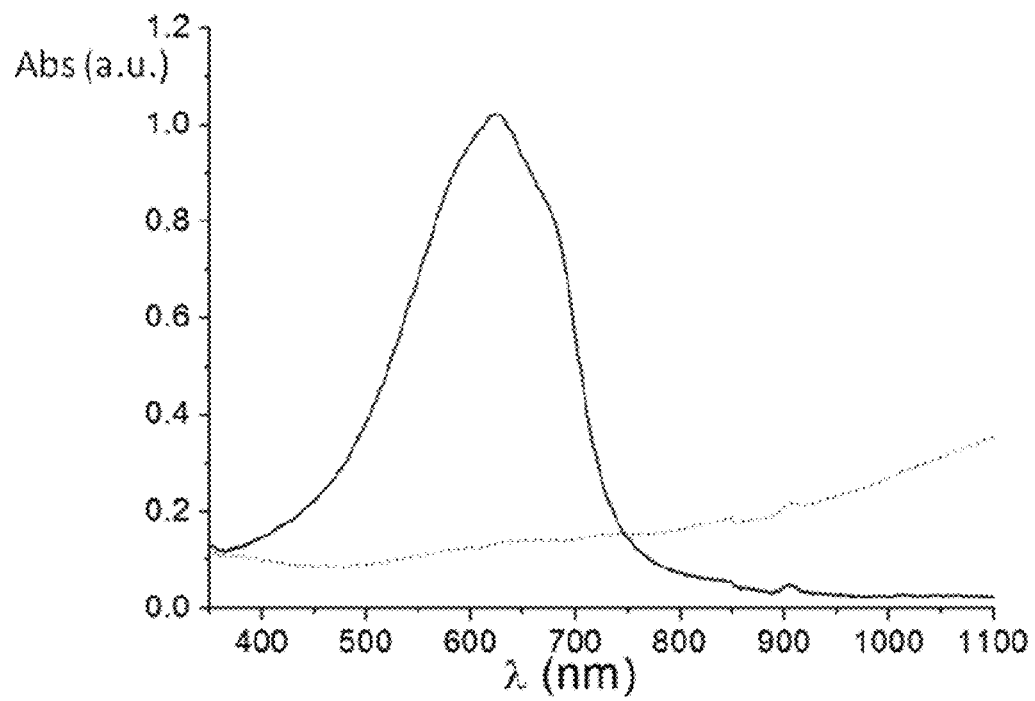
FIG. 9 displays the spectra of the neutral state (straight line) and of the oxidized (dotted line) states.

The optical absorbance of sample TCM71C is measured by optical absorption spectrometry according to the method of example 2a. The measurement was performed in the center part of the film. The spectra of the neutral state (straight line) and of the oxidized (dotted line) states are given in FIG. 9.

The TCM71C sample shows a high degree of polymerization. The layer is thick, the absorbance in the colored state is high enabling the manufacture of ECDs with very low optical transmittance in the dark state.

|  | | $\lambda_{max}$ | T % at $\lambda_{max}$ | | Contrast |
|---|---|---|---|---|---|
|  | Position | [nm] | Bleached | Colored | [%] |
| TCM71C | Center | 321 | 69 | 1 | 68 |

Example 2d

Manufacturing a Working Electrode Film

Several samples were prepared according to the method described in Example 2b, using the cooled solution of Example 1d, with various combinations of mask width for the slot die and web speed, which provided various delivery volumes.

Table 4 shows the operating conditions, the resulting delivery volume, and the corresponding calculated wet film thickness.

TABLE 4

| Trial No. | mask width [μm] | Web speed [m/min] | delivery volume [ml/min] | calculated wet film thickness [μm] |
|---|---|---|---|---|
| TCM41A | 10 | 1 | 2 | 6.67 |
| TCM41B | 10 | 0.67 | 2 | 9.95 |
| TCM41C | 10 | 0.5 | 2 | 13.33 |
| TCM41D | 10 | 0.4 | 2 | 16.67 |
| TCM41E | 10 | 0.35 | 2 | 19.05 |
| TCM43A | 30 | 1 | 2 | 6.67 |
| TCM43B | 30 | 0.67 | 2 | 9.95 |
| TCM43C | 30 | 0.5 | 2 | 13.33 |
| TCM43D | 30 | 0.4 | 2 | 16.67 |
| TCM43E | 30 | 0.35 | 2 | 19.05 |
| TCM43F | 30 | 0.67 | 1.5 | 7.46 |
| TCM43G | 30 | 0.67 | 1.75 | 8.1 |
| TCM43H | 30 | 0.67 | 2 | 9.95 |
| TCM43I | 30 | 0.67 | 2.75 | 13.68 |
| TCM43J | 30 | 0.67 | 3.5 | 17.41 |
| TCM44 | 30 | 0.67 | 2 | 9.95 |

Sample TCM44 was cut out of a part of the coated film, for which the combination of conditions were maintained over 40 meters.

For each sample, the wet film is allowed to warm, level and pre-polymerize at room temperature in the so-called ISP compartment having a length of 3.3 m (corresponding to a pre-polymerization time of 3.3-9.4 min, depending on the web speed, see Table 4) and then dried at 120° C. in the oven (corresponding to drying time of 2-5.7 min, depending on the web speed, see Table 4).

Here again, a longer drying time is feasible and can be useful to improve the film adhesion, and the humidity level is adjusted between 25 and 35% rH in both the solution application and ISP compartments.

After oven drying, the coated film is allowed to relax at room temperature in the relaxation zone 9. The film is then re-wound with low tension using a protective polyethylene film and stored under ambient conditions.

A total amount of 240 ml Example 1d coating solution is sufficient to equip 40 meters of the conducting substrate (305 mm in width) used in the present example with an electrochromic polymer coating having a calculated wet film thickness of 9.95 μm.

Working Electrode Characterization

Electrochemical stability of some working electrodes obtained in the present example has been characterized (after a rinsing step according to the method of example 2b) by cyclovoltammometry, using a 1 molar solution of $LiClO_4$ in propylene carbonate as the electrolyte. Cyclovoltammometry was performed in the center of the film for each sample. For sample TCM44, measurements were also made on left edge and right edge.

Figure 10:
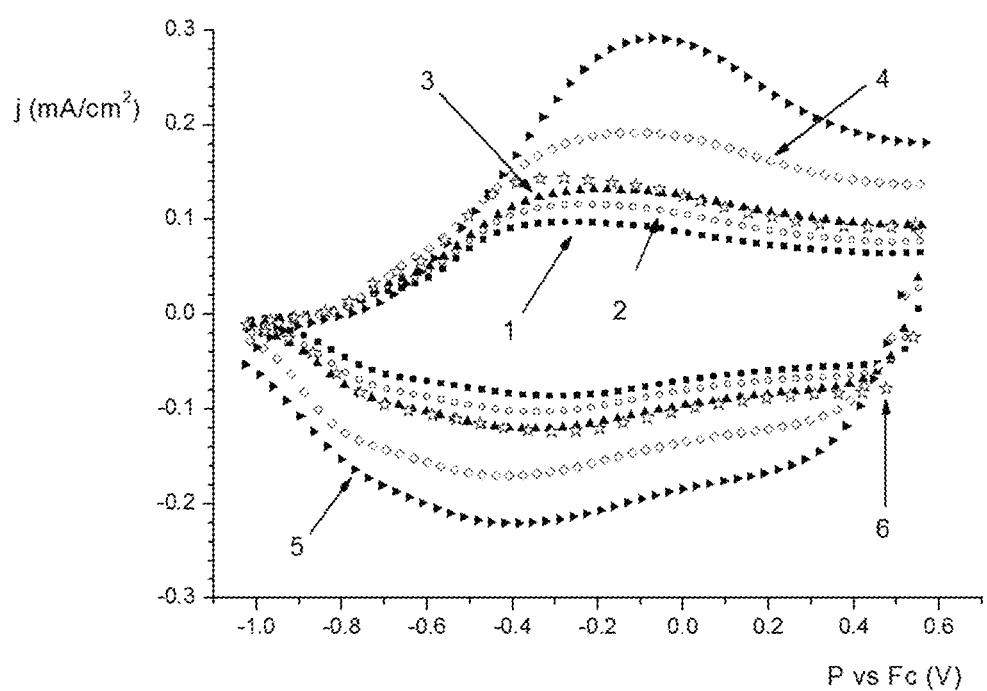
FIG. 10 displays cyclovoltammogramms (CV) in the center part of the various samples, at 50 mV/s. j is the current density, in mA/cm2.

FIG. 10 displays cyclovoltammogramms (CV) in the center part of the various samples, at 50 mV/s. j is the current density, in $mA/cm^2$. P is the potential vs Fc (V). Table 5 shows the correspondence between the samples and the curves.

TABLE 5

| TCM43F | TCM43G | TCM43H | TCM43I | TCM43J | TCM44 |
|---|---|---|---|---|---|
| 1 | 2 | 3 | 4 | 5 | 6 |

Figure 11:
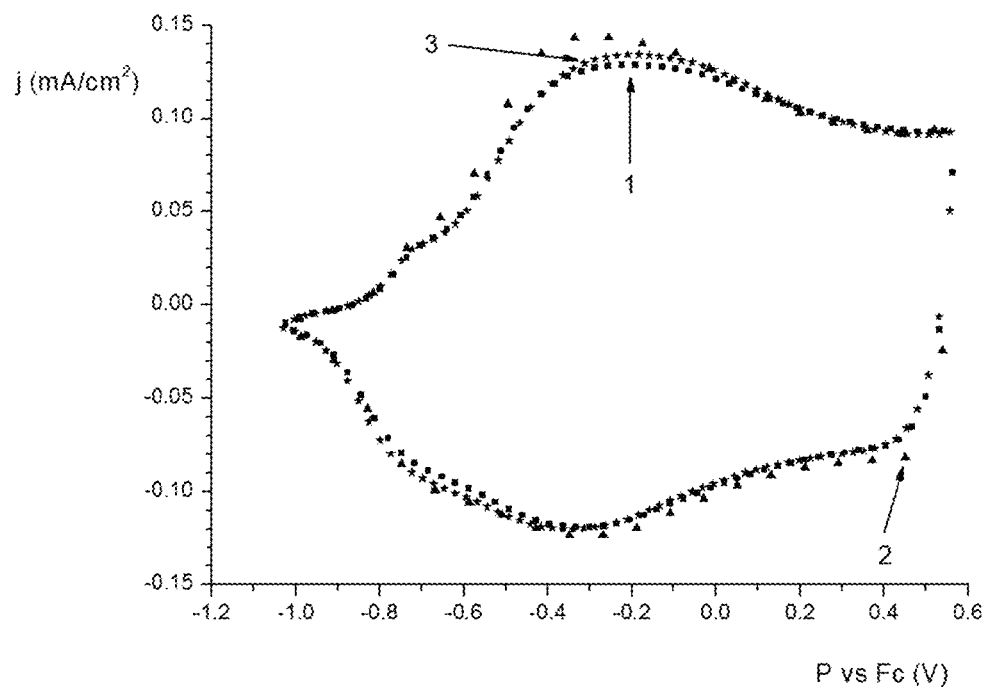
FIG. 11 displays CVs of sample TCM44, at 50 mV/s, of different parts of the film.

FIG. 11 displays CVs of sample TCM44, at 50 mV/s, of different parts of the film. I is the current density, in $mA/cm^2$. P is the potential vs Fc (V). Curves 1, 2 and 3 correspond to the left edge, to the center and to the right edge, respectively.

The electrochemical stability is reached after few cycles in the chosen potential range (−1 to 0.6 V vs. $Fc/Fc^+$). The CVs show a reversible capacity change respectively, measured for the electrodes after rinsing, which is mentioned in table 6.

TABLE 6

| | Sample area [$cm^2$] | Charge capacity [$mC/cm^2$] | T % at 625 nm | | Contrast [%] |
|---|---|---|---|---|---|
| | | | Bleached | Colored | |
| TCM-43F | 4 | 1.94 | 77.28 | 11.72 | 65.56 |
| TCM-43G | 4 | 2.3 | 75.15 | 6.65 | 68.5 |
| TCM-43H | 4 | 2.7 | 71.1 | 3.62 | 67.48 |
| TCM-43I | 3.8 | 3.88 | 61.31 | 0.52 | 60.79 |
| TCM-43J | 3.8 | 5.16 | 51.04 | 0.11 | 50.93 |
| TCM-44-left | 4.4 | 2.71 | 69.64 | 5.66 | 63.98 |
| TCM-44-center | 4 | 2.84 | 63.54 | 3.18 | 60.36 |
| TCM-44-right | 3.4 | 2.69 | 69.76 | 5.17 | 64.59 |

Capacity and dry film thickness may be tailored according to the requirements by adjusting wet film thickness by means of web speed and delivery volume.

Figure 12:
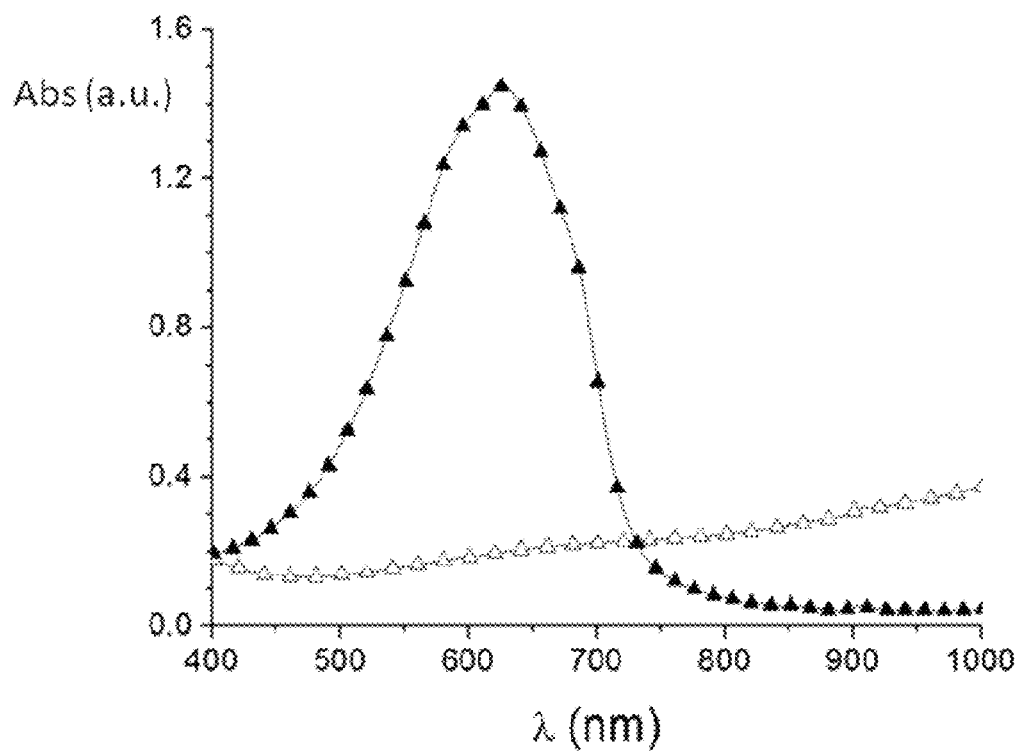
FIG. 12 displays optical absorbance spectra.

The optical absorbance of sample TCM44 is measured by optical absorption spectrometry according to the method of example 2a. The measurement was performed in the center part of the film. The optical absorbance spectra are represented in FIG. 12. The curves represent the oxidized state (empty triangles) and the reduced or neutral state (filled triangles).

Example 2e

Manufacturing a Working Electrode Film

Several samples were prepared according to the method described in Example 2b using the solution of Example 1e, with various delivery volumes at fixed mask width (30 μm) for the slot die and fixed web speed (0.67 m/min). Table 7 shows the operating conditions, the resulting delivery volume, and the corresponding calculated wet film thickness.

TABLE 7

| Trial No. | mask width [μm] | Web speed [m/min] | delivery volume [ml/min] | calculated wet film thickness [μm] |
|---|---|---|---|---|
| TCM70A | 30 | 0.67 | 1 | 4.98 |
| TCM70B | 30 | 0.67 | 1.5 | 7.46 |
| TCM70C | 30 | 0.67 | 1.75 | 8.71 |
| TCM70D | 30 | 0.67 | 2 | 9.95 |

For each sample, the wet film was allowed to warm, level and pre-polymerize at room temperature in the so-called ISP compartment having a length of 3.3 m (corresponding to a pre-polymerization time of 4.9 min at a web speed of 0.67 m/min) and then dried at 120° C. in the oven (corresponding to a drying time of 3.0 min at a web speed of 0.67 m/min).

Here again, a longer drying time is feasible and can be useful to improve the film adhesion, and the humidity level is adjusted between 20 and 35% rH in both the solution application and ISP compartments.

After oven drying, the coated film is allowed to relax at room temperature in the relaxation zone 9. The film is then re-wound with low tension using a protective polyethylene film and stored under ambient conditions.

Working Electrode Characterization

Electrochemical stability of the working electrode (sample TCM70C obtained in the present example) has been characterized by cyclovoltammometry, using a 1 M LiClO$_4$ in propylene carbonate solution as the electrolyte. Sample TCM70C was rinsed prior to characterization, according to the method of example 2a. Cyclovoltammometry was performed in the center part of the film.

Figure 13:
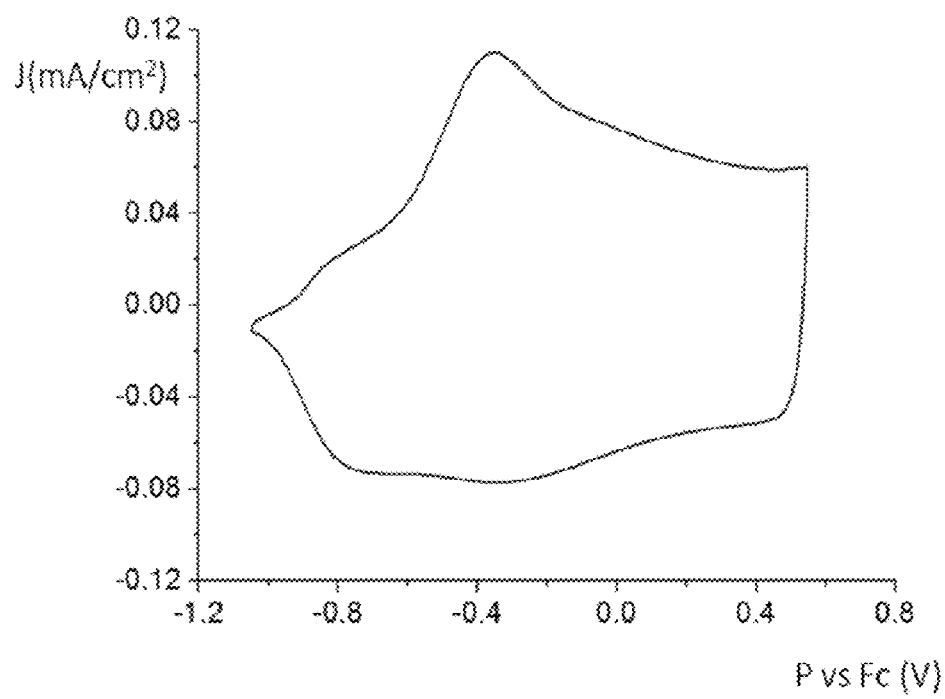
FIG. 13 displays the cyclovoltammogramm on which j represents the current density (in mA/cm2), and P vs Fc (in V) represents the potential vs the ferrocene/ferrocenium couple Fc/Fc+.

FIG. 13 displays the cyclovoltammogramm on which j represents the current density (in mA/cm$^2$), and P vs Fc (in V) represents the potential vs the ferrocene/ferrocenium couple Fc/Fc$^+$.

The electrochemical stability is reached after few cycles in the chosen potential range (−1 to 0.6 V vs Fc). The cyclic voltammetry plot represented in FIG. 13 shows the thin film reversible redox system. The charge density is 2.0 mC/cm$^2$.

Figure 14:
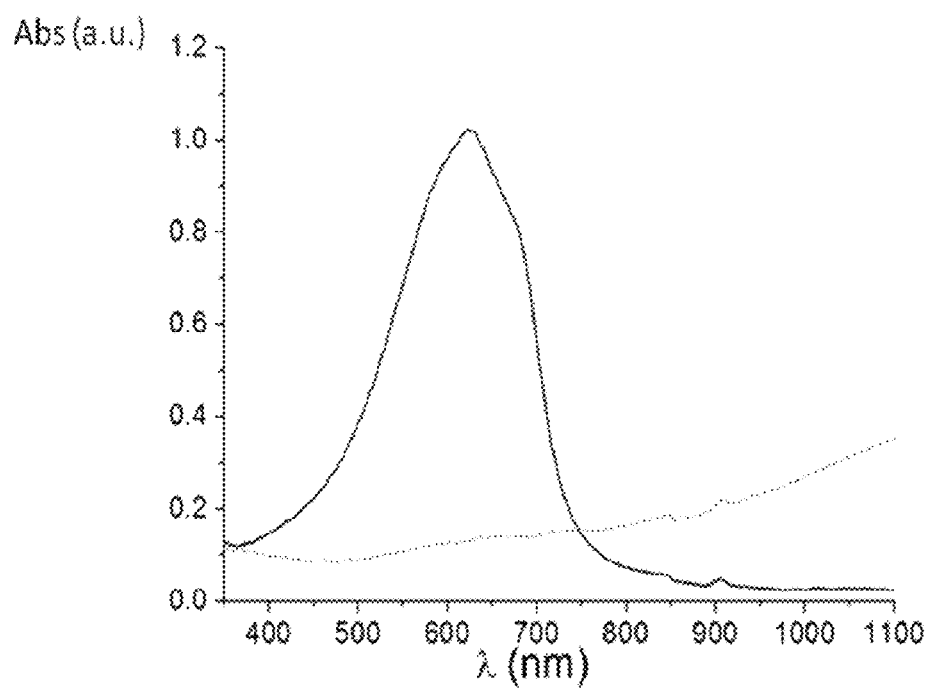
FIG. 14 displays the spectra the neutral state (straight line) and of the oxidized (dotted line) states.

The optical absorbance of sample TCM70C is measured by optical absorption spectrometry according to the method of example 2a. The measurement was performed in the center part of the film. The spectra the neutral state (straight line) and of the oxidized (dotted line) states are given in FIG. 14.

The colored state transmittance is 10%. At 10% there is a reasonable extinction of light but one can still look through the film. The sample can thus be used for dimmable window applications.

|  | Position | $\lambda_{max}$ [nm] | T % at $\lambda_{max}$ Bleached | T % at $\lambda_{max}$ Colored | Contrast [%] |
|---|---|---|---|---|---|
| TCM70C | Center | 623 | 74 | 10 | 64 |

Example 2f

Manufacturing a Working Electrode Film

Several samples were prepared according to the method described in Example 2b, using the solution of Example 1f, with various delivery volumes at fixed mask width (30 μm) for the slot die and fixed web speed (0.67 m/min). Table 8 shows the operating conditions, the resulting delivery volume, and the corresponding calculated wet film thickness.

TABLE 8

| Trial No. | mask width [μm] | Web speed [m/min] | delivery volume [ml/min] | calculated wet film thickness [μm] |
|---|---|---|---|---|
| TCM72A | 30 | 0.67 | 1 | 4.98 |
| TCM72B | 30 | 0.67 | 1.5 | 7.46 |
| TCM72C | 30 | 0.67 | 1.75 | 8.71 |
| TCM72D | 30 | 0.67 | 2 | 9.95 |

For each sample, the wet film was allowed to level and pre-polymerize at room temperature in the so-called ISP compartment having a length of 3.3 m (corresponding to a pre-polymerization time of 4.9 min at a web speed of 0.67 m/min) and then dried at 120° C. in the oven (corresponding to drying time of 3.0 min at a web speed of 0.67 m/min).

Here again, a longer drying time is feasible and can be useful to improve the film adhesion, and the humidity level is adjusted between 20 and 35% rH in both the solution application and ISP compartments.

After oven drying, the coated film is allowed to relax at room temperature in the relaxation zone 9. The film is then re-wound with low tension using a protective polyethylene film and stored under ambient conditions.

Working Electrode Characterization

Electrochemical stability of the working electrode (sample TCM72C obtained in the present example) has been characterized by cyclovoltammometry, using a 1 M LiClO$_4$ in propylene carbonate solution as the electrolyte. Sample TCM72C was rinsed prior to characterization, according to the method of example 2b. Cyclovoltammometry was performed in the center part of the film.

Figure 15:
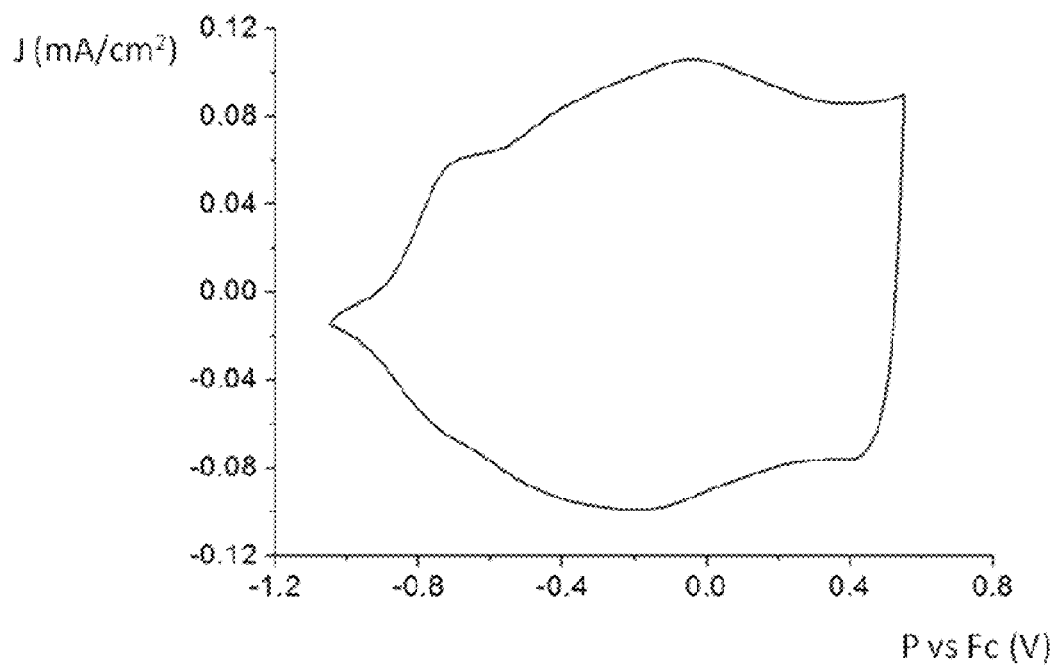
FIG. 15 displays the cyclovoltammogramm on which j represents the current density (in mA/cm2), and P vs Fc (in V) represents the potential vs the ferrocene/ferrocenium couple Fc/Fc+.

FIG. 15 displays the cyclovoltammogramm on which j represents the current density (in mA/cm$^2$), and P vs Fc (in V) represents the potential vs the ferrocene/ferrocenium couple Fc/Fc$^+$.

Figure 16:
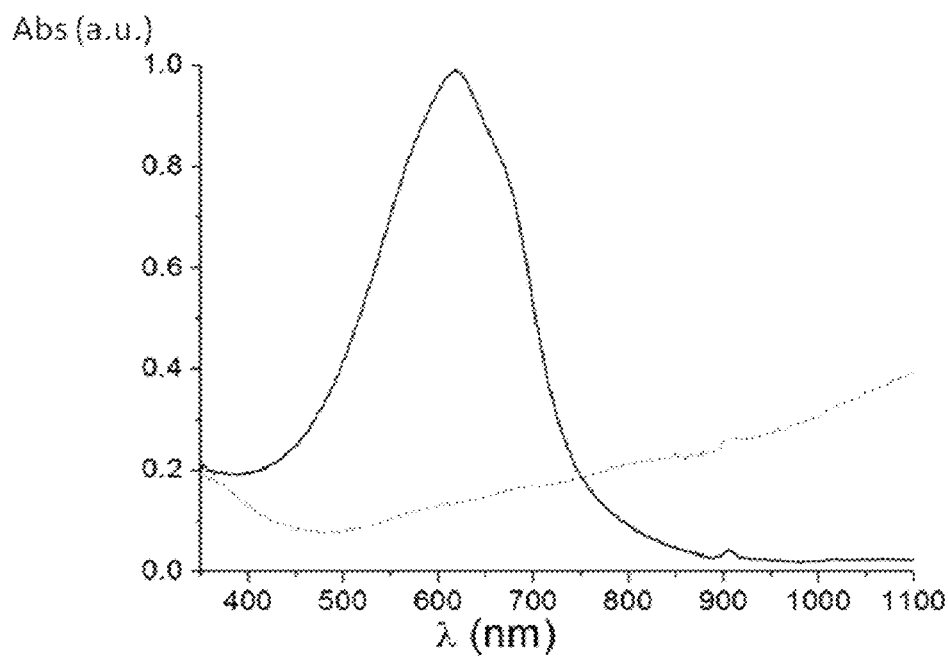
FIG. 16 displays spectra the neutral state (straight line) and of the oxidized (dotted line) states.

The electrochemical stability is reached after few cycles in the chosen potential range (−1 to 0.6 V vs Fc). The cyclic voltammetry plot represented in FIG. 15 shows the thin film reversible redox system. The charge density is 2.5 mC/cm$^2$ The optical absorbance of sample TCM72C is measured by optical absorption spectrometry according to the method of example 2b. The measurement was performed in the center part of the film. The spectra the neutral state (straight line) and of the oxidized (dotted line) states are given in FIG. 16.

The colored state transmittance is 10%. At 10% there is reasonable extinction of light but one can still look through the film. The sample can thus be used for dimmable window applications.

|  | Position | $\lambda_{max}$ [nm] | T % at $\lambda_{max}$ Bleached | T % at $\lambda_{max}$ Colored | Contrast [%] |
|---|---|---|---|---|---|
| TCM72C | Center | 620 | 73 | 10 | 63 |

Example 2g

Comparison of the Optical Absorbance Spectra

Comparison of the optical absorbance spectra obtained according to examples 2a to 2f show that the more flat the bipolaron absorption in the visible range, the less color is observed. The C3 side chain modified polymer (example 2c) and the EDOT-CH$_2$OH polymer (example 2b), due to their short side chains, are improved but still close to PEDOT in terms of electro-optical properties. The polymers with longer side chains (examples 2d, e, f), however, show the advantageous flat bipolaron absorption.

Besides, and partly as a result of the above, the side chain modified materials show higher electrochromic contrasts (typically 55-70%) than PEDOT of example 1a (typically 30-45%), which is obviously favorable for any electrochromic window application.

Example 3a

Electrochemical Pre-conditioning of the Working Electrode

A 30×40 cm$^2$ sized working electrode film as obtained in Example 2d (sample TCM44 after the rinsing step) is attached to a glass plate by adhesive tape, with the coated side up.

A three electrode electrochemical cell is provided, having a glass vessel 40×50×10 cm$^3$ in size (h×w×d) filled with a solution of 0.75 M LiTFSI in propylene carbonate as electrolyte. The counter electrode is made of lithium stripes and the reference electrode is made of a lithium foil. The counter electrode is placed on the vessel backside while the reference electrode is sideways in the vessel.

The glass plate supporting the working electrode film is then carefully placed in said three-electrode electrochemical cell. Employing a potentiostat, 5 potentiodynamic cycles (scan rate 20 mV/s) are performed by scanning the potential between 2.6 and 4.0 V vs. Li$^+$/Li reference electrode. As a final step, a potential of 2.5 V vs. Li$^+$/Li is applied for 130 sec, or up to a stable and current density lower than $3 \times 10^{-4}$ mA/cm$^2$, to bring the working electrode to its reduced state. The reduced working electrode film is then carefully removed, rinsed with ethanol, and dried with pressurized air. The rinsing/drying step is performed twice using a fresh ethanol bath each time.

Example 3b

Chemical Pre-conditioning of the Working Electrode

A flat stainless steel tub (which could also be a polyethylene tub) 40×50×5 cm$^2$ in size (w×l×h) is filled with a solution of 40 g of ethylenediamine in 3960 g of ethanol (1 wt %) up to a filling level of approx. 2 cm. A 30×40 cm$^2$ sized working electrode film as obtained in Example 2d (sample TCM44 after the rinsing step) is carefully immersed in the solution until the entire surface is covered. The conducting polymer film is reduced by the solution and, within five seconds, turns to an air-stable blue to violet state. The sheet is then carefully removed, dried with pressurized air, rinsed in an ethanol bath for 30 s, dried with compressed air, rinsed in a fresh ethanol bath for 15 s and finally dried again. The pre-conditioned sheet is stored in a dry and dust-free atmosphere until assembly.

Example 4a

Prussian Blue Films (Counter Electrodes)

In the present Example, a semi-automatic pilot scale electrophoretic deposition device (Gorkotte GmbH, model SVI 4020) equipped with a Potentiostat/Galvanostat (Elektroniklabor Peter Schrems, model PGU 20V-5A-E) is used to prepare Prussian Blue (PB) films of different charge capacities via cathodic electrodeposition on flexible conducting sheets, having a size of 30×40 cm$^2$ (active area). The sheets are cut from a commercially available conducting plastic film roll, identical to that used in example 2b.

An Fe salt solution having equimolar amounts of Fe$^{II}$ and Fe$^{III}$ is freshly prepared by separately dissolving 99.57 g of potassium ferricyanide K$_3$Fe(CN)$_6$, and 81.09 g of iron (III) chloride hexahydrate FeCl$_3$.6H$_2$O, in each 15 liters of de-ionized or Millipore water. Both solutions are then combined in an electrodeposition bath vessel (made from PVC) having a capacity of 35 liters. This method provides a 0.01 M solution.

A sheet of conducting plastic film is attached to a glass plate by adhesive tape and contacted all around by means of metal tape, which is masked subsequently. The sheet is then subjected to Corona treatment (HF-Corona Generator CG 061, with hand roll electrode, power 0.15 kW). Immediately after activation, the plate is mounted on the (powered) sample holder of the electrophoretic deposition device. As anode, aluminum foil or carbon cloth is used. The substrate is then driven into the bath by an automatic feed mechanism and the deposition is started.

A counter electrode which is suitable for the working electrode film described in trial No. TCM43B of example 2d, must have a reversible charge density of 3 mC/cm$^2$ at least.

Several experiments were made to deposit a counter electrode PB film at constant negative (cathodic) current density, typically in the range of 0.02 to 1 A/m$^2$. It is known that the amount of deposited PB is proportional to the amount of charge Q passing through the surface. Therefore, deposits of desired thickness and charge capacity can easily be formed by choosing a suitable deposition time according to the equation $$Q\ [C/m^2] = I\ [A/m^2] \times t\ [s].$$

The experiments were made by establishing a current density I of
0.6 A/m$^2$ for 50 s
0.2 A/m$^2$ for 150 s,
0.1 A/m$^2$ for 300 s,
0.075 A/m$^2$ for 400 s,
0.035 A/m$^2$ for 857 s, After the deposition is finished, the films are automatically fed into clear water baths to rinse the deposits and remove salty residues and loosely adhering material. The films are then removed from the machine and dried in an oven subsequently at 100° C. and 150° C. over 30 min for each temperature. The films can reversibly be oxidized and reduced in cyclovoltammetry for thousands of cycles. The capacity decrease, which may occur during the initial cycles, is usually not more than 10-20%.

Characterization

A 4 cm$^2$ sample of a Prussian Blue film deposited at 0.075 A/m$^2$ for 400 seconds has been characterized.

Figure 17:
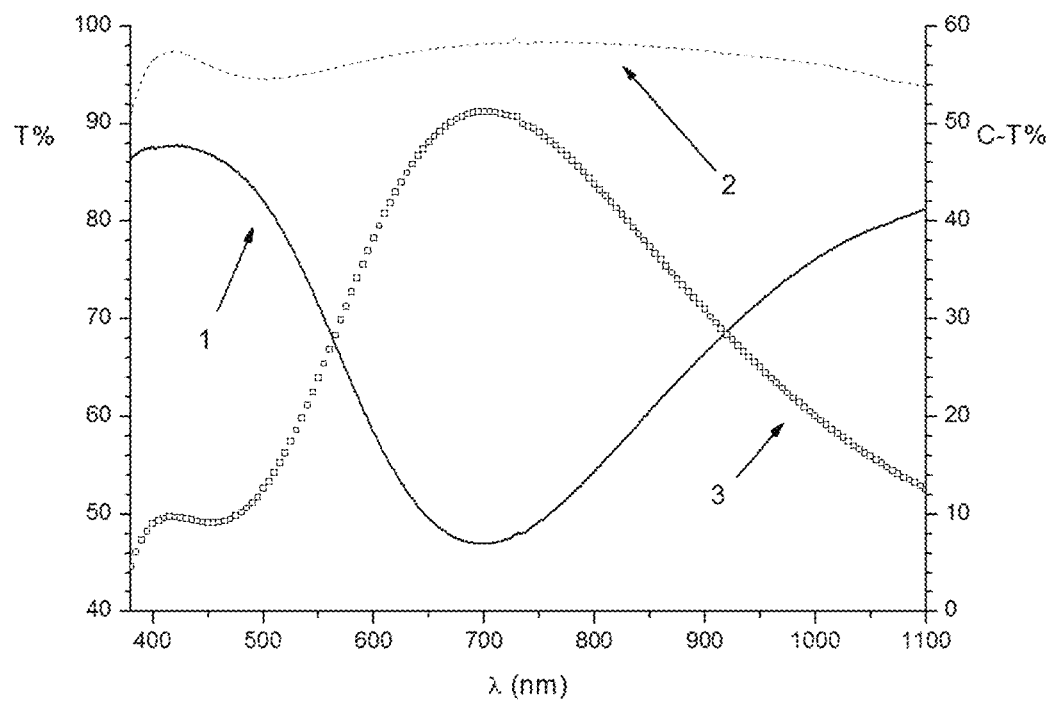
FIG. 17 shows the transmittance spectra of the bleached and colored states (potential window+0.5 to −0.5V vs. Ag/AgCl)

FIG. 17 shows the transmittance spectra of the bleached and colored states (potential window+0.5 to −0.5V vs. Ag/AgCl). Curves 1 and 2 represents the optical transmittance T(%) of the colored (1) and the bleached form (2), respectively. Curve 3 represents the optical contrast (3) C-T(%). A maximum optical contrast of about 50% can be deduced from curve 3. The PB film colors anodically, i.e., in a complementary manner to the working electrode films. It thus contributes substantially to the total optical contrast of the full device.

Figure 18:
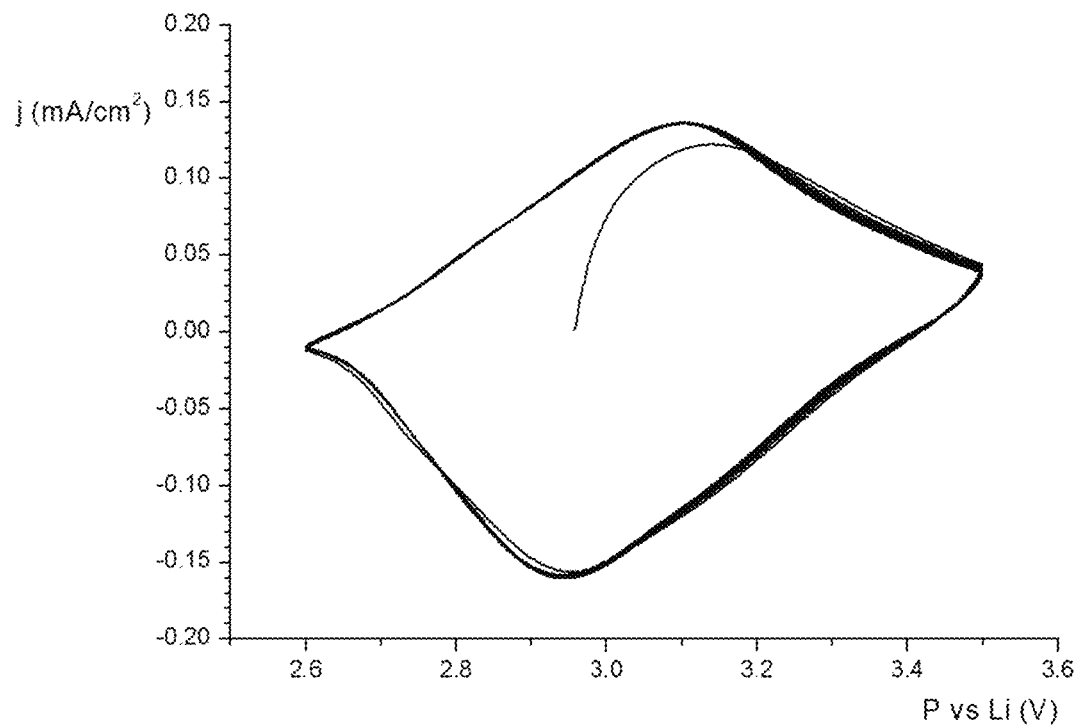
FIG. 18 represents the cyclovoltammogramm showing the current density j (mA/cm2) of this film versus the potential (V vs Li+/Li)

FIG. 18 represents the cyclovoltammogramm showing the current density j (mA/cm$^2$) of this film versus the potential (V vs Li+/Li). An actual charge density of 3.4 mC/cm$^2$ can be derived. The difference of 0.4 units between actual and theoretical charge density can be attributed to redox side reactions and rearrangements taking place in the fresh film.

Example 4b

Prussian Blue Counter Electrodes Using a Continuous Process

A conducting plastic film roll, provided by CP Films/Solutia, Inc. is used as the conducting substrate. It is a PET-ITO film having 5 a thickness of 125 μm, a width of 305 mm and a length of 150 meters, on 6" ID paper core (herein also referred to as 'web').

The device used to manufacture the counter electrode is a Click&Coat® modular line, provided by Coatema Coating Machinery GmbH. It corresponds to FIG. 2.

A stable colloidal solution of 6.00 g Prussian Blue nanoparticles in 234.0 g of toluene or de-ionized water or a water-alcohol mixture (2.5 wt. %) is prepared.

The conducting substrate is inserted in the Click&Coat® modular line where it is first continuously activated by in-line Corona treatment (ARCOTEC CG06, 20% of full power).

The PB colloidal solution is transferred to a slot die by means of a micro annular gear pump and applied to the activated substrate surface, resulting in a wet film.

Several samples were prepared according to the above method, with various combinations of mask widths for the slot die and web speed, which provided various delivery volumes. Table 9 shows the operating conditions, the resulting delivery volume, and the corresponding calculated wet film thickness.

TABLE 9

| Trial No./ Dispersion medium | mask width [µm] | Web speed [m/min] | delivery volume [ml/min] | calculated wet film thickness [µm] |
|---|---|---|---|---|
| TCM15/toluene | 10 | 1.0 | 2.00 | 6.67 |
| TCM45F/water-methanol (90/10 w/w) | 30 | 1.0 | 1.75 | 5.83 |
| TCM45G/water-methanol (90/10 w/w) | 30 | 1.0 | 2.00 | 6.67 |
| TCM45H/water-methanol (90/10 w/w) | 30 | 1.0 | 2.25 | 7.5 |
| TCM45I/water-methanol (90/10 w/w) | 30 | 1.0 | 2.50 | 8.33 |
| TCM45J/water-methanol (90/10 w/w) | 30 | 1.0 | 2.75 | 9.17 |

Electrode Characterization

Figure 19:
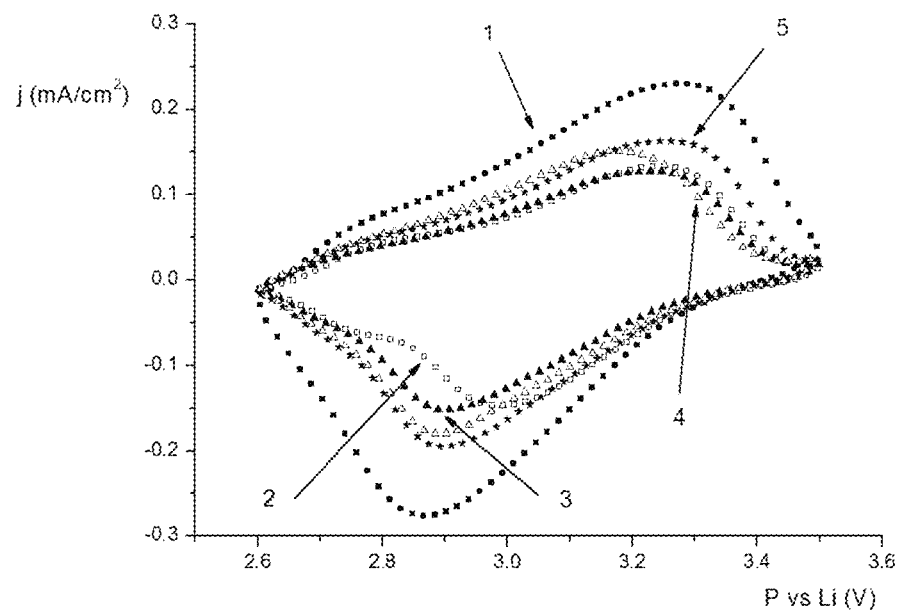
FIG. 19 represents the cyclovoltammogramm (20 mV/s) showing the current density j (mA/cm2) and the potential P vs Li+/Li (V) of some counter electrode films obtained according to the present examples.

FIG. 19 represents the cyclovoltammogramm (20 mV/s) showing the current density j (mA/cm$^2$) and the potential P vs Li$^+$/Li (V) of some counter electrode films obtained according to the present examples The samples show good adhesion. The electrochemical stability is reached after few cycles in the chosen potential range. Nano-Prussian Blue samples show a very similar electrochemical behavior to electrochemically deposited layers. The correspondence between the curves and the samples is noted in the following table.

Figure 20:
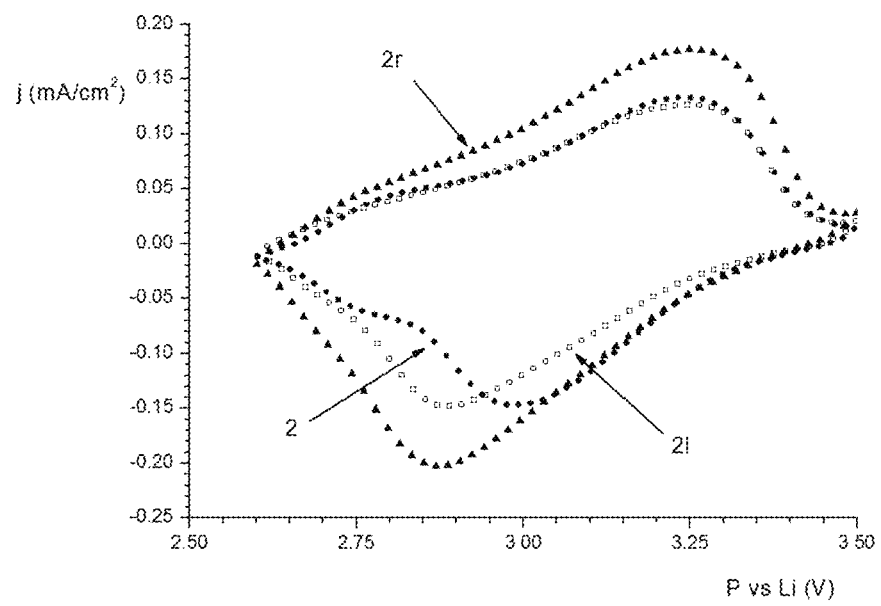
FIG. 20 displays the optical homogeneity of the electrode film.

FIG. 20, compiling the CVs of sample TCM45G measured at three different positions, exemplarily illustrates the optical homogeneity of the electrode film. Apparently, the right side of the TCM45G layer has a higher charge capacity and, thus, is probably more thick than the samples cut from the left side or the center of the film. This example illustrates the result of a deposition gradient due to insufficiently homogeneous distribution of coating solution in the slot die.

Table 10 shows the corresponding reversible charge capacities (determined in LiClO$_4$/propylene carbonate electrolyte). The last column identified the corresponding curve on FIGS. 19 and 20.

TABLE 10

| | Sample area [cm$^2$] | Charge capacity [mC/cm$^2$] | T % @ 680 nm Bleached | T % @ 680 nm Colored | Contrast [%] | curve |
|---|---|---|---|---|---|---|
| TCM45F | 3.6 | 2.35 | 94.86 | 59.95 | 34.91 | 1 |
| TCM45G-left | 4 | 2.94 | 99 | 55.26 | 43.74 | 2l |
| TCM45G-center | 4 | 3.27 | 86.28 | 47.19 | 39.09 | 2 |
| TCM45G-right | 3.6 | 4.21 | 95.38 | 41.05 | 54.33 | 2r |
| TCM45H | 3.4 | 2.95 | 96.21 | 54.05 | 42.16 | 3 |
| TCM45I | 4 | 3.5 | 99 | 49.33 | 49.67 | 4 |
| TCM45J | 3.5 | 3.88 | 96.82 | 43.05 | 53.77 | 5 |

Example 5a

Preparation of Electrolyte Composition

An electrolyte composition is prepared using a solid linear polyether having ethylene oxide units —CH$_2$CH$_2$O—, butylene oxide units —CH$_2$CH(—CH$_2$CH$_3$)—O—, and vinyl substituted units of formula —CH$_2$CH(—O—CH$_2$CH=CH$_2$)—O—, wherein the molar ratio is about 93:5:2) and the molecular weight is a about 100000.

The liquid electrolyte composition is:

| Polyether | 61.6 g |
| LiTFSI | 13.4 g |
| Acetonitrile | 120.02 g |
| Toluene | 33.11 g |
| Esacure KT-046 (U.V. initiator) | 0.0616 g |

The O/Li ratio is 30/1, where O is the number of oxygen atoms provided by the ether units of the polyether and Li is the number of lithium ions provided by LiTFSI.

The polymer in the form of pellets is first dissolved in the solvents by mixing on a roll mixer for 24 h, then the salt is added and thoroughly mixed for another 24 h on a roll mixer. The resulting liquid electrolyte composition has a density of 0.91 g/m, and a viscosity of about 1300 cP. The concentration of "polyether+LiTFSI" in the liquid composition is of 0.30 g/mL.

The UV initiator is added and mixed before using the composition, This solution is stable for 30 days if not exposed to light.

Example 5b

Preparation of Electrolyte Composition

An electrolyte composition is prepared using a liquid prepolymer (designated as TA-210), which is a 4 branch polyether in which each branch is a linear polyether having ethylene oxide units —CH$_2$CH$_2$O—, propylene oxide units —CH$_2$CH(—CH$_3$)—O—, the molar ratio being 80/20; 2 branches have each an acrylate end group, and 2 branches have each a methoxy end group. The molecular weight thereof is about 8000.

The liquid electrolyte composition, in which the O/Li ratio is 20/1, is:

| Prepolymer TA-210 | 100 g |
| LiTFSI | 32.62 g |
| Esacure KT-046 (U.V. initiator) | 0.200 g |

The components of the electrolyte composition are mixed by a planetary centrifugal action over 5 min in an ARE-250 mixer (Thinky Corporation, Japan).

This electrolyte composition which contains the cross-linking agent, can be stored for 30 days if not exposed to light.

Example 5c

Preparation of Electrolyte Composition

An electrolyte composition is prepared using the liquid prepolymer TA-210 mentioned in example 5b and EMI TFSI as an ionic liquid. The liquid electrolyte composition, in which the O/Li ratio is 20/1 is:

| | |
|---|---|
| Prepolymer TA-210 | 100 g |
| LiTFSI | 32.62 g |
| EMI TFSI | 1.0 g |

Irgacure 651 (UV initiator) dissolved in 0.3 g toluene 0.200 g

The components of the electrolyte composition are mixed over 5 min in an ARE-250 mixer (Thinky Corporation, Japan).

Example 5d

Preparation of Electrolyte Composition

An electrolyte composition is prepared using the liquid prepolymer TA-210 mentioned in example 7b and propylene carbonate as a plasticizer.

The liquid electrolyte composition, in which the O/Li ratio is 30/1, is:

| | |
|---|---|
| Prepolymer TA-210 | 100 g |
| LiTFSI | 21.74 g |
| Solution of Irgacure 651 ® in propylene carbonate (10% w/w) | 5.0 g |

The components of the electrolyte composition are mixed over 5 min in ARE-250 mixer (Thinky Corporation, Japan).

Example 7a

Preparation of an Electrolyte Film on a Working Electrode Film (Half Cell)

An electrolyte film has been coated on working electrode film, using the liquid electrolyte composition of example 5a.

The device used to manufacture the working electrode is a Click&Coat® modular line, provided by Coatema Coating Machinery GmbH. It is schematically represented in FIG. 3a.

The substrate on which the electrolyte composition is coated is a working electrode film (sample TCM44) obtained according to example 2d), said film being driven through a roll to roll device at a speed of 0.3 m/min. The liquid electrolyte composition is transferred by means of a micro annular gear pump to a slot die having a mask width of 75 μm×45 cm, which provides a delivery volume of 12 ml/min. The wet film obtained after coating the TCM44 film by means of the slot die is transferred through 3 drying sections respectively at 23° C., 75° C. and 75° C., each of which is 3 meters long, to eliminate the solvent.

The dry film is transferred through a cross-linking section, where it is subjected to a 6000 μW/cm² UV radiation (254.365 nm).

The half cell film obtained after cross-linking the polymer material of the electrolyte film is then protected by a polyethylene film before being wound on a roll, to avoid self adhesion.

Example 7b

Preparation of an Electrolyte Film on a Counter Electrode Film (Half Cell)

An electrolyte film is coated on a substrate which is a counter electrode film (CE film), using an electrolyte composition according to example 5a, according to the following method. The counter electrode film is a 15 cm×20 cm CE film obtained according to example 4a with a current density of 0.075 A/m² for 400 s corresponding to 3mC/cm²

A layer of electrolyte composition having a thickness of 100 μm is applied on the CE film, using a Doctor Blade method. The coated CE film is transferred to an oven at 75° C. for 15 min, where the solvent of the electrolyte composition is removed. The dry electrolyte composition layer coated on the CE film has a thickness of 30 μm before cross-linking. The dry coated CE film is transferred through a cross-linking section under a nitrogen atmosphere, where it is subjected to a 1500 μW/cm² UV radiation (254.365 nm) for 3 minutes.

The resulting film forms a half cell, that is ready to be laminated with a working electrode film.

Example 7c

Preparation of an Electrolyte Film on a Counter Electrode Film (Half Cell)

An electrolyte film is coated on a substrate which is a counter electrode film (CE film) according to the method of example 7b, using an electrolyte composition according to example 5d which is applied at a thickness of 50 μm by using a doctor blade. The step of removing a solvent is omitted, as the electrolyte composition according to example 5d does not contain a low boiling point solvent.

Experiments were made with a 30 cm×20 cm CE film obtained according to example 4a with a current density of 0.075 A/m² for 400 s.

Example 8a

Assembling an Electrochromic Device

Figure 21:
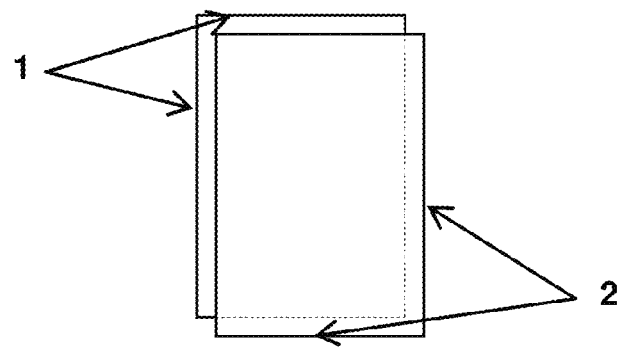
FIG. 21 displays an embodiment where one film is placed on top of the other, with the electrolyte face of the half cell film facing the active material face of the working electrode film, the edges of both films being parallel, with an offset of 1 cm in the length direction and in the width direction.

An ECD is assembled by colaminating a half cell film (counter electrode+electrolyte) as prepared in example 7c, and a working electrode film as prepared in example 3b. The dimension of both films is 20 cm×30 cm. One film is placed on top of the other, with the electrolyte face of the half cell film facing the active material face of the working electrode film, the edges of both films being parallel, with an offset of 1 cm in the length direction and in the width direction, as shown of FIG. 21. On FIG. 21, 1 designated the half cell film, with the electrolyte film facing film 2, and 2 designated the working electrode film, with the active material film facing film 1. This offset allows to connect electrically the ECD obtained after colamination.

The films are then colaminated together between 2 stainless steel rolls of 30 cm of width and 20 cm in diameter with a pressure around 15 kg/cm².

Example 8b

Electrochromic Device Assembly

An ECD is assembled by colaminating a WE film as obtained in example 3b, a half cell film as obtained in example 7c prior to the crosslinking step.

Figure 22:
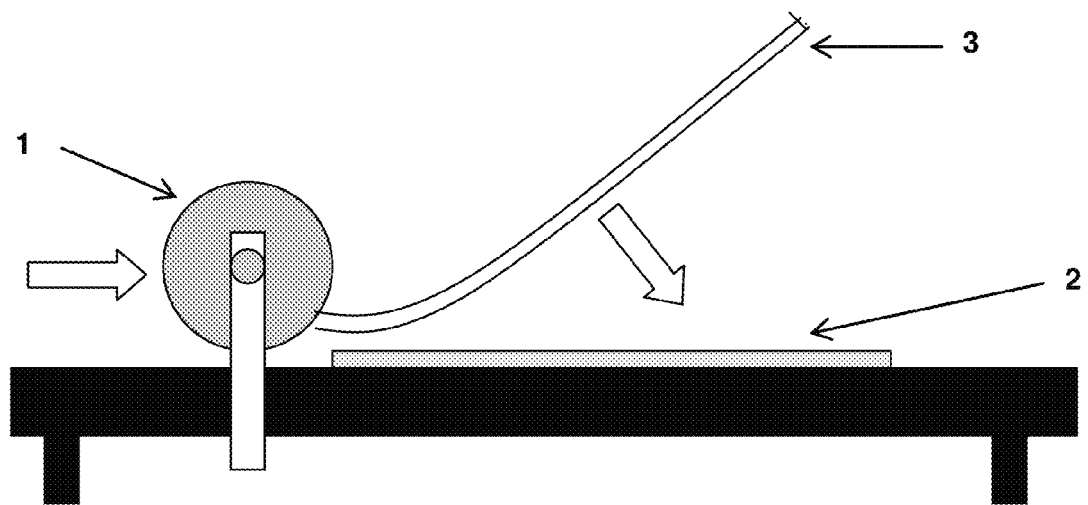
FIG. 22 shows colamination.

The half cell film and the working electrode are colaminated together between a moving rubber roll of 40 cm of width and 10 cm in diameter and a flat metallic surface, with a pressure of less than 10 kg/cm² as shown in FIG. 22 in which 1 is the moving rubber roll, 2 is the half cell film with the liquid polymer electrolyte composition coating upwards, and 3 is the working electrode film with the active material film downwards.

To allow electric contacting of the ECD, the electrodes of dimension of 30 cm×40 cm are colaminated together following the method described in example 8a.

The colaminated films are the transferred in a cross-linking section under a nitrogen atmosphere, where they are subjected to a 1500 µW/cm² UV radiation (254.365 nm) for 1.5 minutes on both sides.

Example 8c

Electrochromic Device Assembly

An ECD is assembled from a TCM44 working electrode (WE) film obtained according to the method of example 3b, a counter electrode (CE) film obtained according to the method of example 4b, and an electrolyte composition according to example 5.

A device similar to the device represented in FIG. 3b is used, except that parts 7 and 8 are placed between the lamination rolls and the rewinding roll 2. Roll 1 supports the WE film. The CE film is fed from roll 8. The CE film and the WE film are conveyed with a speed of 0.5 m/min and a tension force of 120 N.

The electrolyte composition is applied in a continuous manner and under dry conditions (<10 ppm $H_2O$) on the WE film by means of slot die 5 that has an application width of 250 mm and a shim thickness of 150 µm and of a peristaltic pump 4. A clear and smooth polymer electrolyte wet film 50 µm in thickness if formed at the surface of the WE film. The counter electrode film is pressed with gentle pressure by means of the lamination rolls 9 such that no resin is squeezed out at the edges of the laminate and the thickness of the polymer electrolyte layer is retained at 50 µm. Lamination roll slit widths is between 250 and 300 µm.

After having passed the lamination rolls 9, the film stack is allowed to relax for 2-5 m and then UV cured by means of an in-line UV curing module endowed with a Fe-doped mercury lamp (not shown in FIG. 3b). A lamp having a power density of 700-800 µW/cm² and an emission maximum around 340 nm (e.g. American UV model UVC020) is used. The cured laminate is wound on roll 2.

Figure 23:
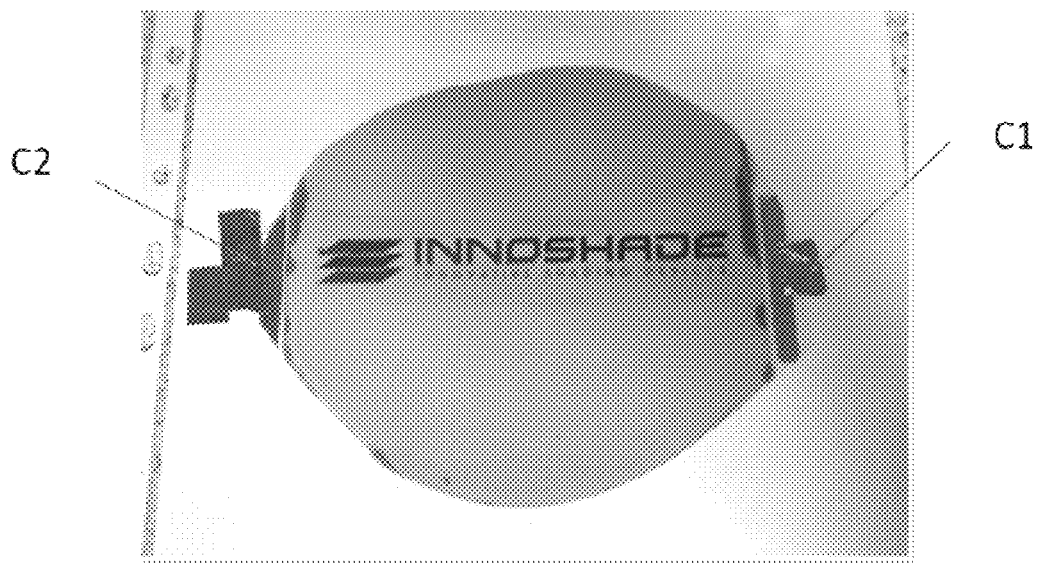
FIG. 23 shows a sample in the bleached state.
Figure 24:
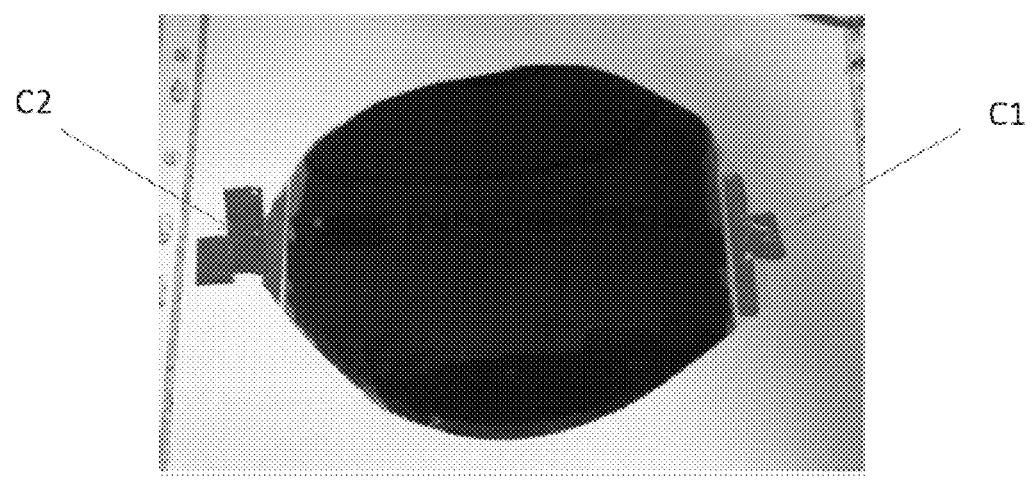
FIG. 24 shows a sample in the colored state (FIG. 24)

A 15 cm diameter disk has been cut out directly from the laminate and provided with contacts. Application of a +/−1.5 V AC current to the sample caused a reversible switch to the bleached/colored states, with good optical memory. FIGS. 23 and 24 shows such said sample in the bleached state (FIG. 23) and colored state (FIG. 24).

Example 9

Figure 25:
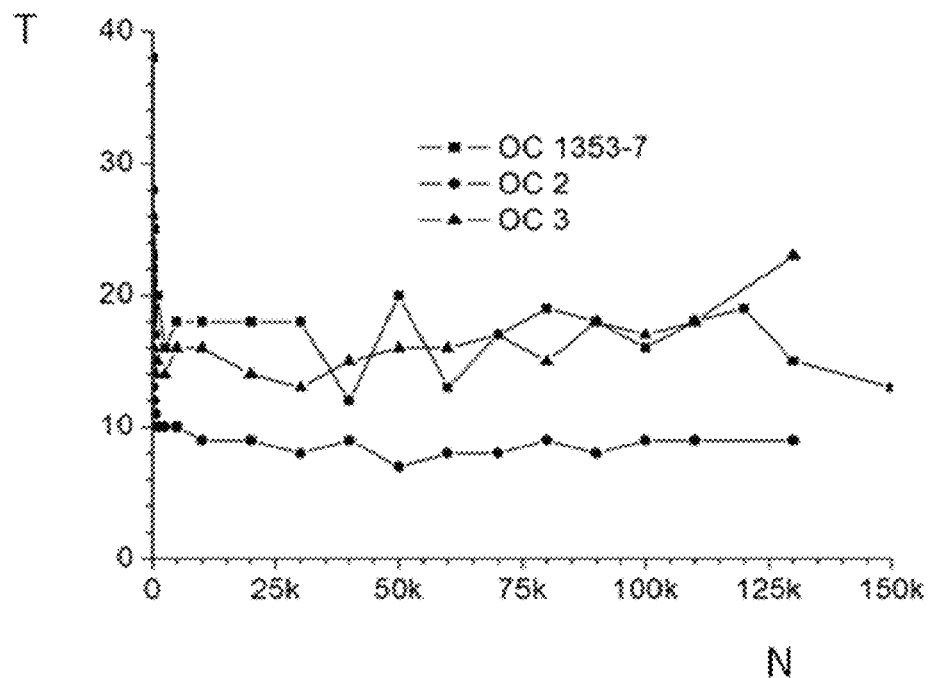
FIG. 25 shows the bleaching response time of 3 ECD's prepared according to Examples 8a, 8b and 8c.
Figure 26:
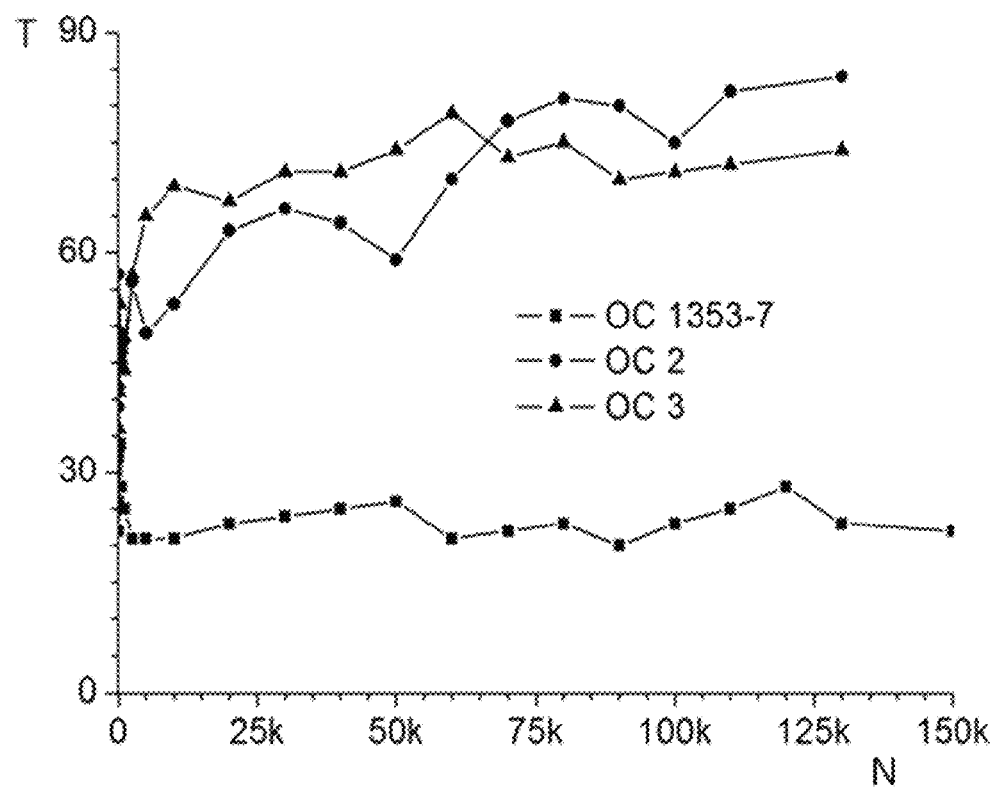
FIG. 26 shows the coloring response time of 3 ECD's prepared according to Examples 8a, 8b and 8c.

The response time of 3 ECD's prepared according to Examples 8a, 8b and 8c is represented of FIGS. 25 (bleaching response time) and 26 (coloring response time). T is the response time in seconds. N is the number of "thousand cycles".

OC 1353-7 corresponds to the ECD of example 8c having PB nanoparticles in the counter electrode.

OC2 and OC3 correspond to the ECD respectively of examples 8a and 8b.

These figures clearly show that the bleaching response time is similar in the 3 ECDs, but the coloring response time is much shorter when nanoparticle PB is used. Electrochemical devices assembled according to certain embodiments of the disclosure do not show any appreciable performance degradation after 1000 switching cycles under ambient conditions. Under laboratory conditions (protective atmosphere) or when sealed properly, 100.000 switching cycles can be achieved without a substantial drop in performance.

Via the above described procedure, mechanically flexible film-like electrochromic devices can be produced that show response times in the range of seconds to tens of seconds. Performances are not substantially reduced after at least 1000 cycles.

The devices can be used as intelligent (i.e. electrically switchable) solar protection films for retrofitting windows of e.g. aircraft cabins, automobiles or any other vehicle. They can also be used to provide variable transmittance properties to any window of domestic appliances, e.g. refrigerators, ovens, micro wave ovens, or wine coolers.

The devices may also be attached to sunglass lenses, visors, welding shields, or any other eye protection device to endow it with variable transmittance properties.

The invention claimed is:

1. A flexible transparent electrochromic device, which comprises the following components, each of which is a flexible film:
    a working electrode comprising a transparent working electrode conducting substrate supporting a working electrode active material;
    a counter electrode comprising a transparent counter electrode conducting substrate supporting a counter electrode active material; and
    a solid polymer electrolyte, wherein:
    the working electrode active material is a polymer having repeat units of general formula (I)

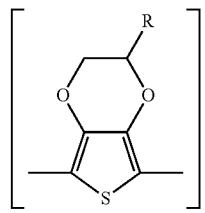

wherein R is —$CH_2OH$, or —$CH_2OR'$, R' being selected from the following groups: —R", —(C=O)NH–R" or —(C=O)—R", R" being an alkyl group or an alkenyl group;
    the counter electrode active material is selected from hexacyanometallates or from transition metal oxides, and
    the solid polymer electrolyte is a film material that comprises a crosslinked polymer and a lithium salt.

2. The electrochromic device of claim 1, wherein the solid polymer electrolyte is a transparent flexible film having a thickness of 1 to 100 µm, made of an electrolyte material that comprises a crosslinked polymer and a lithium salt.

3. The electrochromic device of claim 2, wherein the electrolyte material further comprises an ionic liquid, a plastifying agent, or both.

4. The electrochromic device of claim 2, wherein the crosslinked polymer is a polymer having polyether segments linked by covalent bonding linking groups.

5. The electrochromic device of claim 4, wherein the polyether segments comprise repeat units —O—$CH_2CHR^s$— wherein $R^s$ is H or a side group selected from $CH_3$ and $CH_2CH_3$ and the covalent bonding linking groups are n-butylene groups, multibranched ether groups or butylene diester groups.

6. The electrochromic device of claim 1, wherein the thickness of each of the working electrode conductive substrate and the counter electrode conductive substrate is from 75 µm to 175 µm.

7. The electrochromic device of claim 1, wherein each of the working electrode conductive substrate and the counter electrode conductive substrate is made of a flexible transparent film selected from the group consisting of transparent conducting polymer, a non conducting polymer film having a transparent conducting coating made of a transparent oxide coating or a metal coating, a metal grid, and a combination thereof.

8. The electrochromic device of claim 7, wherein the transparent conducting coating is a film of a transparent conducting oxide (TCO), selected from the group consisting of tin doped indium oxide (designated by ITO), As doped zinc oxide (designated by AZO), Ga doped zinc oxide (designated by GZO), Sn doped zinc oxide (designated by TZO), Si doped zinc oxide (SZO), and a fluorine doped tin oxide (designated by FTO).

9. The electrochromic device of claim 7, wherein the non conducting polymer film is selected from the group consisting of polyesters, polyacrylates, aromatic or aliphatic polycarbonates, and polyimides.

10. The electrochromic device of claim 7, wherein the transparent conducting polymer forming the conducting substrate is a poly(XDOT), XDOT being a 3,4-alkylene dioxythiophene monomer optionally having a substituent on a carbon of the alkylene group.

11. The electrochromic device of claim 1, wherein the counter electrode active material is selected from the group consisting of $Fe^{II}/Fe^{III}$ hexacyanoferrate, In hexacyanometallate, $V_2O_5$, $NiO_x$, $LiFePO_4$, $H_xIrO_2$, $Li_4Ti_5O_{12}$ and $TiO_2$.

12. The electrochromic device of claim 11, wherein the counter electrode active material is $Fe^{II}/Fe^{III}$ hexacyanoferrate in the form of nanoparticles.

13. The electrochromic device of claim 1, wherein:
the device has a thickness of 170 µm to 400 µm;
at least one conducting substrate has a thickness of 75 µm to 175 µm and is made of a non conductive polymer film having a transparent conducting oxide coating;
the working electrode active material and the counter electrode active material each have a thickness of 100 nm to 500 nm;
the SPE has a thickness of 1 µm to 100 µm.

14. A method for preparing a working electrode for an electrochromic device according to claim 1, said method comprising the following steps:
providing a working electrode conducting substrate made of a flexible transparent conducting material film;
providing a liquid composition containing one or more monomers (II) dissolved in a solvent;
coating said liquid composition on the working electrode conducting substrate to form a coated composition; and
treating the coated composition to polymerize the monomers,
wherein the monomer (II) is of formula

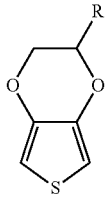

wherein R is —$CH_2OH$, or —$CH_2OR'$, R' being selected from the following groups: —R", —(C=O)NH—R" or —(C=O)—R", R" being an alkyl group or an alkenyl group.

15. The method of claim 14, wherein the liquid composition containing the monomer(s) (II) further contains one or more additional constituents selected from the group consisting of moderator bases, oxidizing agents, and adhesion promoters.

16. A method for preparing a counter electrode for an electrochromic device according to claim 1, said method comprising the following steps:
preparing a counter electrode composition which contains a stable suspension of active counter electrode nanoparticles;
coating said counter electrode composition on the surface of the counter electrode conducting substrate.

17. The method according to claim 16, wherein the counter electrode composition contains $Fe^{II}/Fe^{III}$ hexacyanoferrate precursors and is coated on the counter electrode conducting substrate by electrodeposition under a constant negative current density.

18. The method according to claim 16, wherein the counter electrode composition applied on the counter electrode conducting substrate is a stable suspension of Prussian $Fe^{II}/Fe^{III}$ hexacyanoferrate nanoparticles in a liquid support, and said composition is applied on the counter electrode conductive substrate by an electroless process.

19. A method for preparing a solid polymer electrolyte for an electrochemical device according to claim 1, wherein said method comprises the following steps:
preparing a liquid electrolyte composition which contains a lithium salt and a cross-linkable solvating prepolymer;
coating said electrolyte composition on a surface of a substrate film to form a coated substrate film;
submitting the coated substrate film to a cross-linking treatment.

20. A method according to claim 19, wherein the liquid electrolyte composition further contains an ionic liquid.

21. A method according to claim 19, wherein the substrate film on which the electrolyte composition is coated is the active material of one of the electrodes of the electrochromic device.

22. A method according to claim 19, wherein the cross-linkable solvating prepolymer is a branched polyether having cross-linkable end groups or a linear polyether having a cross-linkable end group on side groups.

23. A method according to claim 22, wherein a polyether forming the linear polyether or branches of the branched polyether is made of repeat units —O—$CH_2CHR^5$— wherein $R^5$ is H, or $R^5$ is selected from $CH_3$, $CH_2CH_3$ and cross-linkable groups selected from vinyl groups, acrylate groups or methacrylate groups, at least part of the $R^5$ groups being crosslinkable groups.

24. A method for assembling an electrochromic device according to claim 1, wherein:
the solid polymer electrolyte is formed from an electrolyte composition coated on an active surface of one of the electrodes thus forming a half cell,
said half cell is assembled with the other electrode by colamination;
solvating prepolymer of the electrolyte composition is submitted to crosslinking before or after assembling the half cell and the second electrode.

* * * * *